(12) United States Patent
Poikat et al.

(10) Patent No.: US 12,523,568 B2
(45) Date of Patent: Jan. 13, 2026

(54) DEVICE AND METHOD FOR MEASURING IMAGING PROPERTIES OF AN OPTICAL SYSTEM

(71) Applicant: TRIOPTICS GMBH, Wedel (DE)

(72) Inventors: Ralf Poikat, Wedel (DE); Albert Milczarek, Wedel (DE); Frank Peter, Wedel (DE)

(73) Assignee: Trioptics GmbH, Wedel (DE)

( * ) Notice: Subject to any disclaimer, the term of this patent is extended or adjusted under 35 U.S.C. 154(b) by 239 days.

(21) Appl. No.: 18/239,275

(22) Filed: Aug. 29, 2023

(65) Prior Publication Data

US 2023/0400380 A1    Dec. 14, 2023

Related U.S. Application Data

(63) Continuation of application No. PCT/EP2022/054456, filed on Feb. 22, 2022.

(30) Foreign Application Priority Data

Mar. 2, 2021  (DE) .................... 10 2021 105 027.8

(51) Int. Cl.
*G01M 11/02*   (2006.01)

(52) U.S. Cl.
CPC .... *G01M 11/0292* (2013.01); *G01M 11/0214* (2013.01)

(58) Field of Classification Search
CPC .................... G01M 11/02092; G01M 11/0214
See application file for complete search history.

(56) References Cited

FOREIGN PATENT DOCUMENTS

| CN | 104865047 A | | 8/2015 | |
|---|---|---|---|---|
| CN | 208751828 U | * | 4/2019 | ............. G02B 7/005 |
| DE | 10 2015 006 015 A1 | | 11/2016 | |
| EP | 3 410 091 A1 | | 12/2018 | |

* cited by examiner

*Primary Examiner* — Jamil Ahmed
(74) *Attorney, Agent, or Firm* — Muncy, Geissler, Olds & Lowe, P.C.

(57) ABSTRACT

A device for measuring imaging properties of an optical system including: a rigid holding device; and MTF measuring devices arranged at predefined positions of the holding device such that, by each of the MTF measuring devices, a modulation transfer function can be measured at respective different, predefinable, angular positions in the image field of the optical system; wherein the holding device includes at least a first holder and a second holder; the MTF measuring devices include a first group and a second group; the first holder holds the first group at first positions so that the first group are arranged on a first spherical shell; the second holder holds the second group at second positions so that the second group are arranged on a second spherical shell; and the first spherical shell and the second spherical shell have different radii and are arranged so as to be mutually concentric.

20 Claims, 17 Drawing Sheets

DEVICE AND METHOD FOR MEASURING IMAGING PROPERTIES OF AN OPTICAL SYSTEM

CROSS-REFERENCE TO RELATED APPLICATION

The present application is a continuation of PCT/EP2022/054456 filed on Feb. 22, 2022, which claims priority to DE 10 2021 105 027.8, filed on Mar. 2, 2021, the entire contents of each of which is incorporated herein by reference.

BACKGROUND

Field

The present disclosure relates to a device for measuring imaging properties of an optical system, and more particularly to a device for measuring imaging properties of an optical system wherein the device comprises: a test-object holder, configured to position the optical system to be tested at a predefined testing position, a rigid holding device, and a plurality of modulation transfer function (MTF) measuring devices, arranged at firmly predefinable positions of the holding device such that, each of the MTF measuring devices are configured to measure a modulation transfer function at respective different, likewise firmly predefinable, angular positions in the image field of the optical system. The present disclosure furthermore relates to a method for measuring imaging properties of an optical system using such a device.

Prior Art

A measurement of the imaging properties of an optical system is often carried out within the context of quality control and/or for characterization of imaging optical systems. A widespread measuring method for this purpose is the measurement of the modulation transfer function (MTF). MTF measurements are carried out on a very wide range of optical systems. They are carried out in large numbers in the mass production of lenses, and also for characterization of high-quality special optics.

A known MTF testing device is marketed by Trioptics GmbH, under the trade name ImageMaster® PRO. In the ImageMaster® PRO devices, a plurality of telescopic cameras are used, which are each mounted at firmly specified angular positions relative to the optical axis of the test object and in the "viewing direction" with respect to the pupil of the test object. This is achieved by using a dome-shaped or cap-shaped camera holder, wherein the cameras are arranged on the inside of said dome. The cameras serve as MTF measuring devices and look at the center of curvature of the dome, along their optical axes. At the same time, all the telescopic cameras are oriented towards the pupil of a single optical system, which is placed, as the test object, at a testing position. By such a measuring device, it is possible for a plurality of MTF measurements to be carried out simultaneously at different field positions, represented by the different angular positions, in the image field of the optical system to be tested. For this purpose, for example an illuminated graticule plate is imaged in the image plane of the optical system to be tested, by the respective telescope lens of the MTF testing device, onto the camera sensor thereof.

In order to determine the imaging quality of the optical system to be tested at a higher degree of accuracy, it is desirable to achieve a high measuring point density. The measuring point density correlates directly with the number of MTF measuring devices used. The more MTF measuring devices are positioned in an angular range of the imaging lens to be tested, the higher the measuring point density in said angular range. However, each MTF measuring device, i.e. each individual camera including its imaging lens, has an endless spatial extent. For this reason, it is not possible to simply increase the measuring point density in an existing system. If the mechanically closest, and thus densest possible, arrangement of the MTF measuring device is achieved, in which the MTF measuring devices touch one another, the limit for the number of possible measuring points is also reached.

A possibility for increasing the number of measuring points would be to increase the dimensions of the overall measuring device, wherein a larger number of MTF measuring devices could be arranged on a dome having a larger radius. However, in this approach the measuring device quickly becomes unmanageably large.

CN 104865047 A discloses an MTF measuring device, the cameras of which, used for the MTF measurement, are fastened to a pivotable dome. Said cameras are configured for carrying out infinite measurements. After an infinite measurement has been completed, the dome is pivoted, such that the MTF measuring devices fastened thereto move away from the optics to be tested and free up a travel path. On this travel path, further image sensors, arranged on a flat retaining plate, are placed in the field range of the optics to be tested. Said cameras arranged in a plane are configured for carrying out a finite measurement. Thus, the entire dome-shaped structure including the camera is configured so as to be pivotable, such that, following a completed finite measurement, a measurement in a finite distance can be carried out using the further image sensors.

It is thus necessary, between carrying out the infinite measurement and carrying out the finite measurement, to move the measuring device between two configurations. This is possible only in the case of a mechanically movable structure, which, overall, does not constitute a rigid holding device. A holding device which comprises moving parts inevitably has the structural disadvantages associated with moving parts, which have an effect on the measuring accuracy and speed. These are inter alia greater structural complexity and tolerances and accuracies that are reduced or can be achieved only with significant extra effort. Furthermore, by the known measurement always only either an infinite measurement or a measurement of finite distance can be carried out; a simultaneous measurement using all the available cameras is structurally impossible.

A further measuring device is known from CN 208751828 U. This comprises a plurality of MTF measuring devices, which are arranged on a dome. In order to be able to record measured values at high density in a central imaging region of an optical system to be tested, the device comprises image sensors arranged at a finite distance, by which a measurement can be carried out in the central region of the optical system to be tested. These measuring devices arranged at a finite distance are sensors on which the optics to be tested directly produce an image, and which carry out a determination of the imaging quality using a technique that is not disclosed in greater detail. While the cameras comprising optical attachments could be MTF measuring devices, this is possible in technical terms only with limitations, by the sensors which acquire a direct image of a test object imaged by the optical system to be tested. In order that a sharp image can be acquired at all in the case of finite imaging, the selected distance between the sensor and the test object must be matched to the optics to be tested, and a sensor size must be selected by which the entire test structure can be acquired. In contrast to a measurement which is carried out on the basis of imaging in infinity and in which the spacing between the test object and telescope is irrelevant, this condition significantly restricts the field of application of the disclosed solution.

A device for measuring an imaging property of an optical system is known from DE 10 2015 006 015 A1, which device generates a light pattern in a focal plane of the optical system. The device comprises an arrangement of N mutually separated cameras, wherein each camera comprises a lens and a light sensor which is arranged in a focal plane of the lens. The cameras are arranged on a side opposite the light pattern generation device, in such a way that each camera acquires, by its light sensor, the image resulting from interaction of the optical system, from exactly one section of the light pattern. At least one beam deflection element is arranged between the optical system and at least one of the cameras in such a way that it deflects the light, striking the at least one camera, from a reference axis of the device, to which the optical system is directed.

SUMMARY

An object is to provide a device and a method for measuring imaging properties of an optical system, which can be achieved with little structural effort, has compact dimensions, and/or allows for acquisition of MTF measurement data in a central imaging region of an optical system to be tested, having a high measuring point density.

Such object can be solved by a device for measuring imaging properties of an optical system, wherein the device comprises:
- a test-object holder configured to position the optical system to be tested at a predefined testing position, a rigid holding device, and a plurality of MTF measuring devices arranged at firmly predefinable positions of the holding device such that, each of the MTF measuring devices configured to measure a modulation transfer function at respective different, likewise firmly predefinable, angular positions in the image field of the optical system, and
- the holding device comprises at least a first and a second holder, and the plurality of MTF measuring devices comprises a first and a second group of MTF measuring devices, wherein
- the first holder is configured to hold the MTF measuring devices of the first group at first positions so that the MTF measuring devices of the first group are arranged on a first spherical shell,
- the second holder is configured to hold the MTF measuring devices of the second group at second positions so that the MTF measuring devices of the second group are arranged on a second spherical shell, wherein
- the first and the second spherical shells have different radii and are arranged so as to be mutually concentric.

Within the context of the present description, a rigid holding device is to be understood to mean a holding device without movable parts. The plurality of MTF measuring devices is arranged at firmly predefinable positions of the holding device, which means that said devices are located at fixed positions during the measured value acquisition, and may not be moved. The MTF measuring devices can, for example for the purpose of an adjustment, be attached to the holding device in a manner such that the positions thereof can be changed, such as being set. Such a possibility of change can be achieved for example in that the MTF measuring devices are received by screws guided through slots.

The optical system of which the imaging properties are measured can be a refractive optical system. In the context of the present description, a refractive optical system is understood to mean an optical system which comprises at least one refractive optical element, for example, all the optical elements of the optical system can be refractive optical elements.

The MTF measuring devices can be measuring cameras which are configured to determine the modulation transfer function (MTF) of the optical system as the test object. For this purpose, the MTF measuring devices are equipped with suitable optics. The MTF measuring devices can be received on the holding device in such a way that they do not cover the fields of view of the MTF measuring devices. In other words, the MTF measuring devices can be arranged in such a way that they do not impede one another when the measurements are being carried out.

The angular position of the MTF measuring devices can determine a position of the MTF measuring devices in the image field of the optical system to be tested.

The device can allow for simultaneous measurement of the optical imaging quality of an optical system to be tested, on the basis of MTF measurements, wherein a high measuring point density can be achieved. The MTF measurements can be carried out simultaneously, which allows for the optical system to be tested to be characterized at higher speed. The mechanical construction of the device can be configured to not require movable parts, which can benefit the precision and the speed of the measurements performed. The device is furthermore can be very flexible, because it is possible to characterize, using said device, both optical systems having a large maximum field of view (FOV), i.e. large field angle, and optical systems having a small field angle. It is not necessary to alter, modify or move the device for this purpose.

The MTF measuring devices can be cameras, which can be equipped with suitable finite or infinite optics, such that they can record the test object imaged by the optical system to be tested, for example a cross-shaped aperture or the like. It is likewise possible to equip the MTF measuring devices with collimators, which can be capable of focusing.

The device can be configured in such a way that all the MTF measuring devices that the device comprises are configured in a similar manner, i.e. are configured for the same type of measurement. For example, all the MTF measuring devices can carry out an infinite measurement.

The mechanical structure of the device, which may not have any moving parts, is extremely temperature-stable, which can be beneficial for the mass testing of optical systems over longer time periods. The holding device can for example be implemented by a plurality of mechanically rigid struts, which interconnect the first and the second holder or provide a suitable holding structure for said holders.

In the case of MTF measuring devices as are known from the prior art, the number of measuring points that can be acquired, which is limited by the mechanical extension of the MTF measuring devices, could be increased in that the MTF measuring devices can be arranged at a greater distance from the optical system to be tested. It would then be possible to arrange a larger number of MTF measuring devices in a field angle of the optical system to be tested that is the same size. However, this measure significantly increases the size of the devices for measuring the imaging properties of the optical system. This disadvantage can be overcome by the multi-stage construction. A solution is provided in which a large number of measuring points per field angle can be recorded, wherein at the same time the compact dimensions of the measuring devices can be largely retained. In the case of a multi-stage arrangement, it is possible to arrange the MTF measuring devices on the first and second holder in such a way that their fields of view do not overlap. Thus, each individual MTF measuring device can detect a corresponding MTF measured value in the image field of the optical system to be tested.

The MTF measuring devices can be arranged on the holding device in such a way that the optical axes of the MTF measuring devices intersect in a plane of an aperture or pupil of the optical system to be tested. For example, the centers of the spherical shells can also lie in the plane of the aperture or pupil of the optical system to be tested.

According to a further embodiment, the holding device can comprise a third holder and the plurality of MTF measuring devices can comprise the first and second group and additionally a third group of MTF measuring devices, wherein the third holder can be configured to hold the MTF measuring devices of the third group at third positions so that the MTF measuring devices of the third group are arranged on a third spherical shell, wherein the third spherical shell can have a third radius that is different from the first and second radii and arranged so as to be concentric to the first and second spherical shell.

Introducing a third plane makes it possible for the measuring point density per field angle of the optical system to be tested to be further increased. The even greater distance between the MTF measuring devices and the optical system to be tested makes it possible to provide an even larger number of MTF measuring devices per field angle.

Within the context of further embodiments, it is also provided that, in addition to the above-mentioned three planes, yet further planes can be provided, such that a device according to such an embodiment comprises more than three planes. The construction can, as described above for the first three planes, be continued systematically without problem with a fourth, fifth, sixth plane, etc., without it being necessary to take particular structural measures that deviate from the described concept.

The further planes can be provided by further holders of the holding device and can be configured to hold the MTF measuring devices, held on the corresponding plane, in a manner arranged on a further spherical shell. The spherical shells of all the holders can be arranged concentrically to one another, and thus the centers of the spherical shells can all coincide at one point.

According to a further embodiment, the first radius of the first spherical shell can be greater than the second radius of the second spherical shell, and the second radius of the second spherical shell can be greater than the third radius of the third spherical shell, such that the MTF measuring devices of the first group have in each case a greater distance from the optical system to be tested than the MTF measuring devices of the second group, and the MTF measuring devices of the second group can have in each case a greater distance from the optical system to be tested than the MTF measuring devices of the third group.

The MTF measuring devices of the first group can serve to acquire a high measuring point density in a central imaging region of the optical system to be tested. The MTF measuring devices of the second and third group can serve to capture regions of the field range of the optical system to be tested that are located further towards the outside, i.e. the edge regions of the field of view. Depending on the size of the viewing angle/field range of the optical system to be detected, it can also be provided to consult only individual groups of the MTF measuring devices for characterizing the optical system to be tested. If the device is configured, for example, to measure optical systems having an image angle of 200° (using the MTF measuring devices of the first and the second group), optical systems having an image angle of for example up to 50° can be measured merely using the MTF measuring devices of the first group.

The device can be further developed in that, for all the MTF measuring devices of the first group, a first lateral angle between an optical axis of the optical system to be tested and an optical axis of the MTF measuring device can be smaller than a second lateral angle between the optical axis of the optical system to be tested and an optical axis of any MTF measuring device of the second group, and for all the MTF measuring devices of the second group a second lateral angle between an optical axis of the optical system to be tested and an optical axis of the MTF measuring device can be smaller than a lateral angle between the optical axis of the optical system to be tested and an optical axis of any MTF measuring device of the third group.

The central arrangement of the MTF measuring devices of the first group can be read easily on the basis of an angle between the optical axes thereof and an optical axis of the optical system to be tested. An angular interval which is typically enclosed by the axes of the MTF measuring devices of the second group together with the optical axis of the optical system to be tested is above the interval for the first group.

The first group can include an axial MTF measuring device, the optical axis of which coincides with the optical axis of the optical system to be tested (with the proviso of an ideal orientation of the optical system to be tested).

According to a further embodiment, a lateral angle between two adjacently arranged MTF measuring devices of the first group can be smaller than a lateral angle between two adjacently arranged MTF measuring devices of the second group, and the second lateral angle can be smaller than a third lateral angle between two adjacently arranged MTF measuring devices of the third group.

The mentioned lateral angles between the adjacently arranged MTF measuring devices can be determined in the following manner Depending on whether the MTF measuring devices are those of the first, second or third group, a great circle can be placed on the first, second or third spherical shell, on which circle the adjacent MTF measuring devices can be located. The angle can now be determined in the plane of said great circle. By definition, the center of the corresponding spherical shell is also located in the plane of the great circle. The definition of the lateral angle corresponds to that as is usually used for a field angle of an image region, wherein in this case reference is made to the optical system to be tested.

MTF measured values in a central image field range of the optical system to be tested can be obtained at a high measuring point density by such a measuring device.

In the case of camera dimensions typical in industry, the first lateral angle can be in a range between 2.7° and 3.1°, such as in a range between 2.8° and 3.0°, or at least approximately 2.9°. The second lateral angle can be for example in a range between 3.0° and 9°, such as in a range between 3.1° and 7°, or at least approximately 3.3°. The third lateral angle can be for example in a range between 9° and 13°, such as in a range between 10° and 12°, or at least approximately 11°.

According to a further embodiment, the holders of the holding device can extend, at least in portions, along the corresponding spherical shell.

In the context of the present description, the expression "extend along" is to be understood to mean that the corresponding holders of the holding device extend at a constant distance from the respective spherical shell. That is to say, in other words, that the holders do not necessarily have the same radius as the associated spherical shell.

According to a further embodiment, the first holder can be configured as a spherical cap, and the second and/or the third holder can be configured as a spherical cap having a central opening, wherein the second and/or the third holder can be annular, and wherein the second and/or the third holder can be configured in the form of a spherical zone.

A spherical zone, which is also referred to as a spherical layer or spherical disc, can be part of a spherical surface cut out of two parallel planes. The cut-out curved surface portion is typically referred to as the spherical zone of the corresponding spherical layer or spherical disc. The second and/or third holder can be configured such that its surface extends along a spherical zone of this kind. This can allow the cameras of the next-highest plane a view through the central opening of the annular holder located therebelow. It is thus possible for a mechanically stable holding device for the MTF measuring devices to be provided, without the MTF measuring devices impeding one another or restricting the viewing angle.

According to a further embodiment, the first holder can be configured as a spherical cap and the second and/or the third holder can be configured in each case as at least one bracket, wherein the brackets can be in each case fastened to the first holder at a first end close to the first holder and extend along great circles of the first or second spherical shell in the direction of a distal free end, wherein the great circles can extend within planes that intersect along an optical axis of the optical system to be tested.

A bracket construction of the holder can allow for a particularly light-weight and moreover material-saving construction of the relevant holder. Furthermore, a fastening element between the first holder and the second holder can be omitted, if the first and the second holder are fastened directly to one another, or a structurally small, and therefore efficiently configured, component can be used. The brackets, from which for example the second holder can be constructed, can for example be fastened, at their first end, directly to the first holder, which is a spherical cap. According to an embodiment, said spherical cap can receive only an axial MTF measuring device, which can be arranged centrally in the spherical cap. The remaining MTF measuring devices can be received on brackets.

According to a further embodiment, the holders of the holding device can be configured in such a way that a displacement of the MTF measuring devices on the associated spherical shell is possible. The MTF measuring devices of the first group can thus be displaceably arranged on the first spherical shell, the MTF measuring devices of the second group can be displaceably arranged on the second spherical shell, and the MTF measuring devices of the third group can be displaceably arranged on the third spherical shell. This can be achieved for example in that the MTF measuring devices are fastened to the holders using slots. The slots can extend along great circles on the spherical shells.

According to a further embodiment, the connection between the spherical cap and the brackets can be achieved using slots, such that the brackets can be displaced along said slots which can extend along great circles. This can allow a flexible adjustment of the field angle of the device to the measuring task in question.

The great circles furthermore can extend in planes which intersect in a common axis. Said axis can coincide with the optical axis of the optical system to be tested.

Such object can be furthermore solved by a method for measuring imaging properties of an optical system using a device according to one or more of the above-mentioned embodiments. The method can comprise arranging the optical system to be tested in the test-object holder, and carrying out MTF measurements simultaneously using all the MTF measuring devices.

This method can allow for very quick characterization of the optical system to be tested, since the MTF measurements can all be carried out simultaneously. The method can furthermore be very flexible, because it is possible to characterize both optical systems having a large field angle and also optical systems having a small field angle on the same device.

BRIEF DESCRIPTION OF THE DRAWINGS

Further features become clear from the description of embodiments, together with the claims and the accompanying drawings. Individual features or a combination of a plurality of features can fulfil embodiments.

The embodiments are described in the following, without restricting the general inventive concept, on the basis of embodiments with reference to the drawings, wherein reference is explicitly made to the drawings with regard to all the details that are not explained in greater detail in the text. In the drawings.

DETAILED DESCRIPTION

Figure 1:
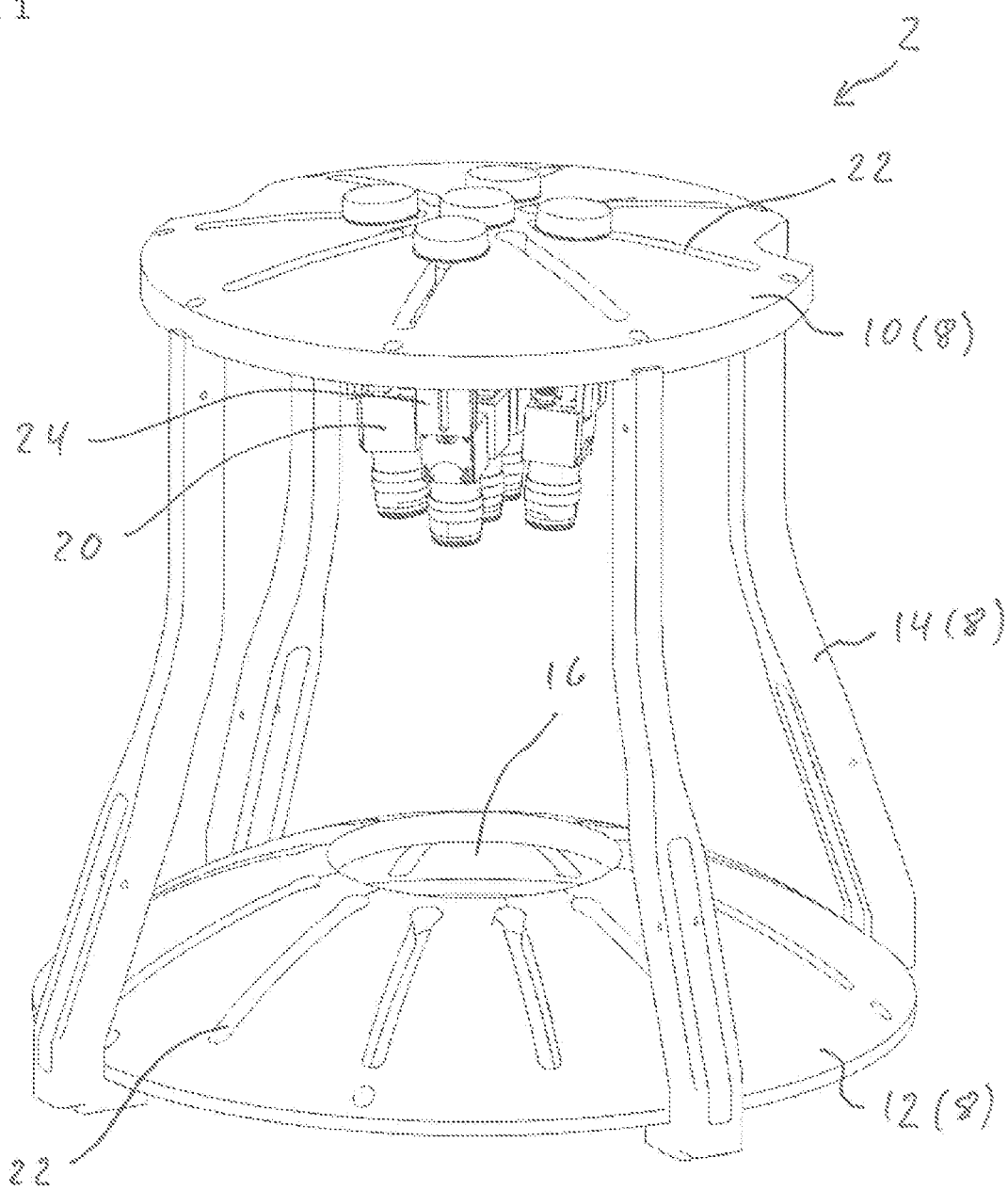
FIGS. 1 and 2 each illustrate schematic and simplified perspective views of a device for measuring imaging properties of an optical system, according to a first embodiment.
Figure 1:
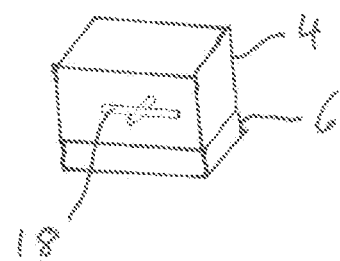

FIG. 1 is a schematic and simplified perspective view of a device 2 for measuring imaging properties of an optical system 4. The optical system 4 can be a refractive optical system 4. Merely by way of example, reference is made in the following description to a refractive optical system 4 of this kind. The refractive optical system 4 is shown highly schematically and is for example imaging optics, such as a lens or the like. The device 2 comprises a test-object holder 6, which is configured to position the optical system 4 to be tested at a predefined testing position. The device 2 further comprises a rigid holding device 8 which, in the embodiment shown, comprises a first holder 10, a second holder 12, and struts 14 connecting the two holders 10, 12, of which struts only one is provided with a reference sign, for reasons of clarity. By way of example, the first holder 10 is configured as a spherical cap (also referred to as a dome). The second holder is annular, wherein it is also configured as a spherical cap but comprises a central opening 16. The second holder 12 is configured as a spherical zone, i.e. the surfaces thereof extend along two concentric spherical zones. The first holder 10 also extends along a first spherical shell which, however, has a larger radius compared with a second spherical shell along which the second holder 12 extends. The first spherical shell and the second spherical shell are arranged so as to be mutually concentric. The centers of said two spherical shells are located at the sphere center 18 marked by a cross in FIG. 1. Said sphere center 18 can lie in the plane of an aperture of the optical system 4 to be tested.

A plurality of MTF measuring devices 20 is fastened to the holding device 8. The MTF measuring devices 20, of which only one is provided with a reference sign, for reasons of clarity, are for example cameras that are equipped with suitable optics. The MTF measuring devices 20 are fastened to the holding device 8 in such a way that they are located in a firmly predefinable position on the holding device 8. Each of the MTF measuring devices 20 can measure a modulation transfer function (MTF) at a firmly predefinable angular position in the image field of the optical system 4.

The holding device 8 is rigid, i.e. it does not have any moving parts. The MTF measuring devices 20 are located at fixed positions. However, they can be positioned flexibly, for example within the context of an initial adjustment of the device 2. For this purpose, the first holder comprises slots 22, along which the MTF measuring devices 20 can be displaced. The MTF measuring devices 20 are fixed via knurled screws, which are visible on the top of the first holder 10. The slots 22 can extend along great circles of the first spherical shell, along which the first holder 10 extends.

Figure 2:
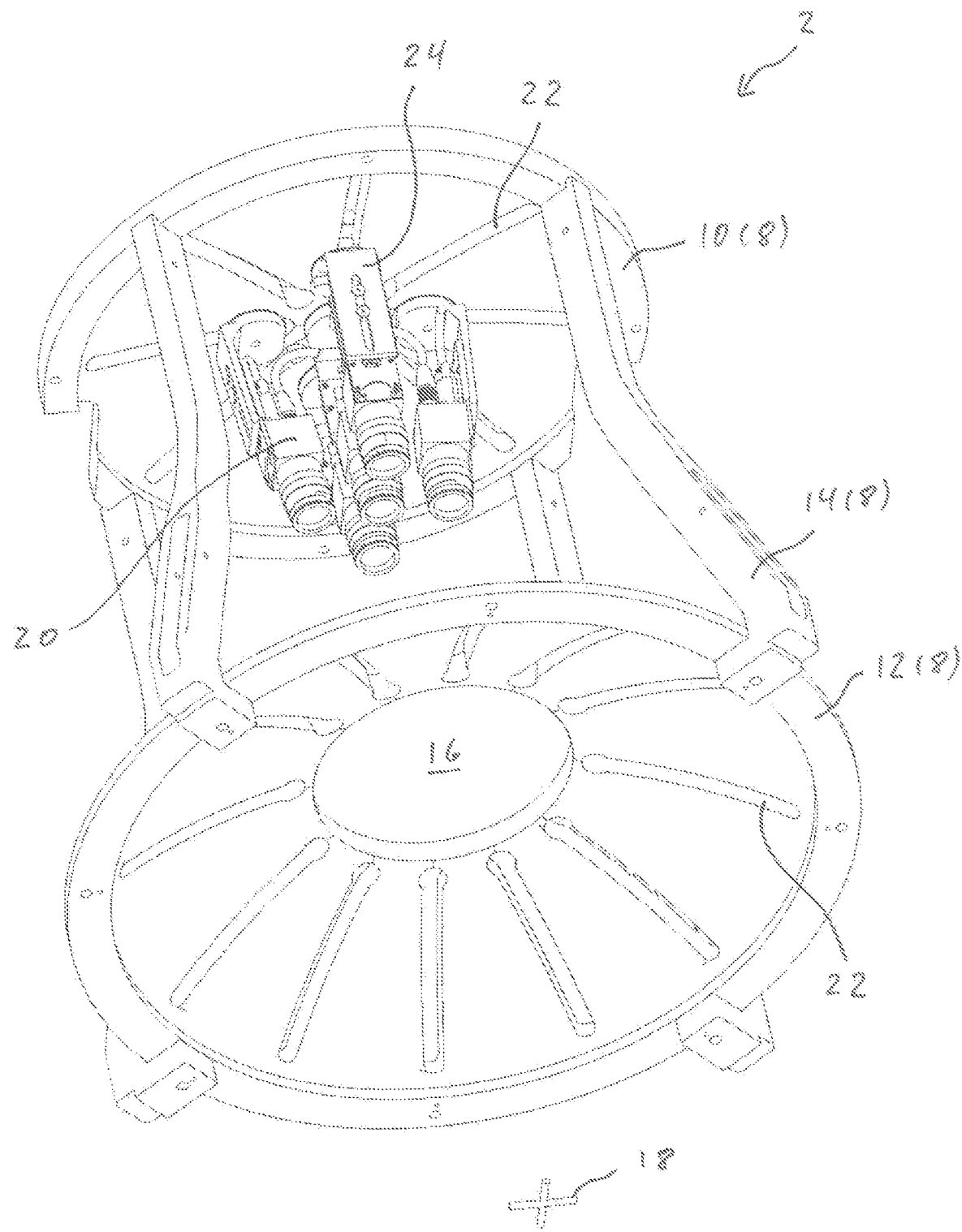

The device 2 is configured for receiving a plurality of MTF measuring devices 20. Said plurality of MTF measuring devices 20 is divided into a first group and a second group of MTF measuring devices 20. The first group of the MTF measuring devices 20 is fastened to the first holder 10. Said first group is shown in FIG. 1. A second group of MTF measuring devices 20, which is not shown in FIG. 2, is fastened to the second holder 12. For said MTF measuring devices 20 the same applies as has been stated above with respect to the MTF measuring devices 20 of the first group. They are located at firmly predefinable positions. However, it is possible to adjust their position. For this purpose, the second holder 12 also comprises slots 22, of which again only one is provided with a reference sign, for reasons of clarity. The slots 22 of the second holder 12 preferably extend along great circles of the second spherical shell, along which the second holder 12 extends. Similarly as is shown in FIG. 1 for the MTF measuring devices 20 held by the first holder 10, the MTF measuring devices 20 of the second group are located under the second holder 12 in FIG. 1. The MTF measuring devices 20 of the first and second group are arranged on the first and second holder 10, 12, respectively, in such a way that the optical axes of the MTF measuring devices 20 intersect in the sphere center 18. In other words, the MTF measuring devices 20 are thus attached to the holding device 8 in such a way that their optical axes intersect in a plane of the aperture of the optical system 4 to be tested.

The MTF measuring devices 20 of the first group are arranged on a first spherical shell, which means that the sensors of the camera used as the MTF measuring device 20 can be located inside said first spherical shell. The first holder 10 extends along said first spherical shell, which does not mean, however, that the holder 10 extends inside said spherical shell with the same radius. The first holder 10 extends at a constant distance from said first spherical shell, such that the desired arrangement of the first group of the MTF measuring devices 20 can be provided. This construction makes it possible to use simple camera holders 24 for receiving the MTF measuring devices 20, which camera holders maintain the directional orientation predefined by the dome-shaped construction of the first holder 10, and position the MTF measuring device 20 merely radially further towards the inside, i.e. closer to the optical system 4. The same applies for the receiving of the MTF measuring devices 20 of the second group, which are not shown in FIG. 1.

The MTF measuring devices 20 of the first group are configured to carry out MTF measurements in a central region of the image field of the optical system 4. Since said MTF measuring devices 20 are arranged at a greater distance from the optical system 4 to be tested, it is possible to arrange more MTF measuring devices 20 per field angle of the optical system 4 compared with the second group. This means that MTF measured values having a higher measuring point density can be acquired in a central region of the image field of the optical system 4. At the same time, the device 2 makes it possible to cover a large field angle in the MTF measurement, MTF measurements over large field angles can be carried out by the MTF measuring devices 20 of the second group. This makes it possible to test optical systems 4 which have a large image or field angle, wherein the entire image field of the optical system 4 can be tested. At the same time, the device 2 can also test optical systems 4 which have a small field angle, for example telephoto lenses. It is not necessary to alter the device 2 between testing for example a wide-angle lens having a large field angle and a telephoto lens having a small field angle. It is also possible that for example only the MTF measuring devices 20 of the first group are used for testing telephoto lenses. The MTF measuring devices 20 are arranged, for this purpose, in such a way that the image regions thereof do not overlap. During the measurement, the MTF measuring devices 20 of the first group look through the central opening 16 present in the second holder 12. At the same time, the MTF measuring devices 20 of the second group (not shown in FIG. 1) are arranged in such a way that they do not impede the image field of the MTF measuring devices 20 of the first group.

FIG. 2 is a further schematic and simplified perspective view of the device 2 already known from FIG. 1. The refractive optical system 4 to be measured, and the test-object holder 6, are not shown in FIG. 2, for reasons of clarity, only the sphere center 18 is indicated, which is located in the plane of the test object aperture. FIG. 2 shows the device 2 viewed from below. The way in which the MTF measuring devices 20 are received on corresponding camera holders 24, on the first holder 10, is clearly visible. The MTF measuring devices 20 of the first group, which are shown, look through the opening 16 of the second holder 12, at the optical system 4 to be tested. The optical axes of the MTF measuring devices 20 intersect in the sphere center 18.

Figure 3:
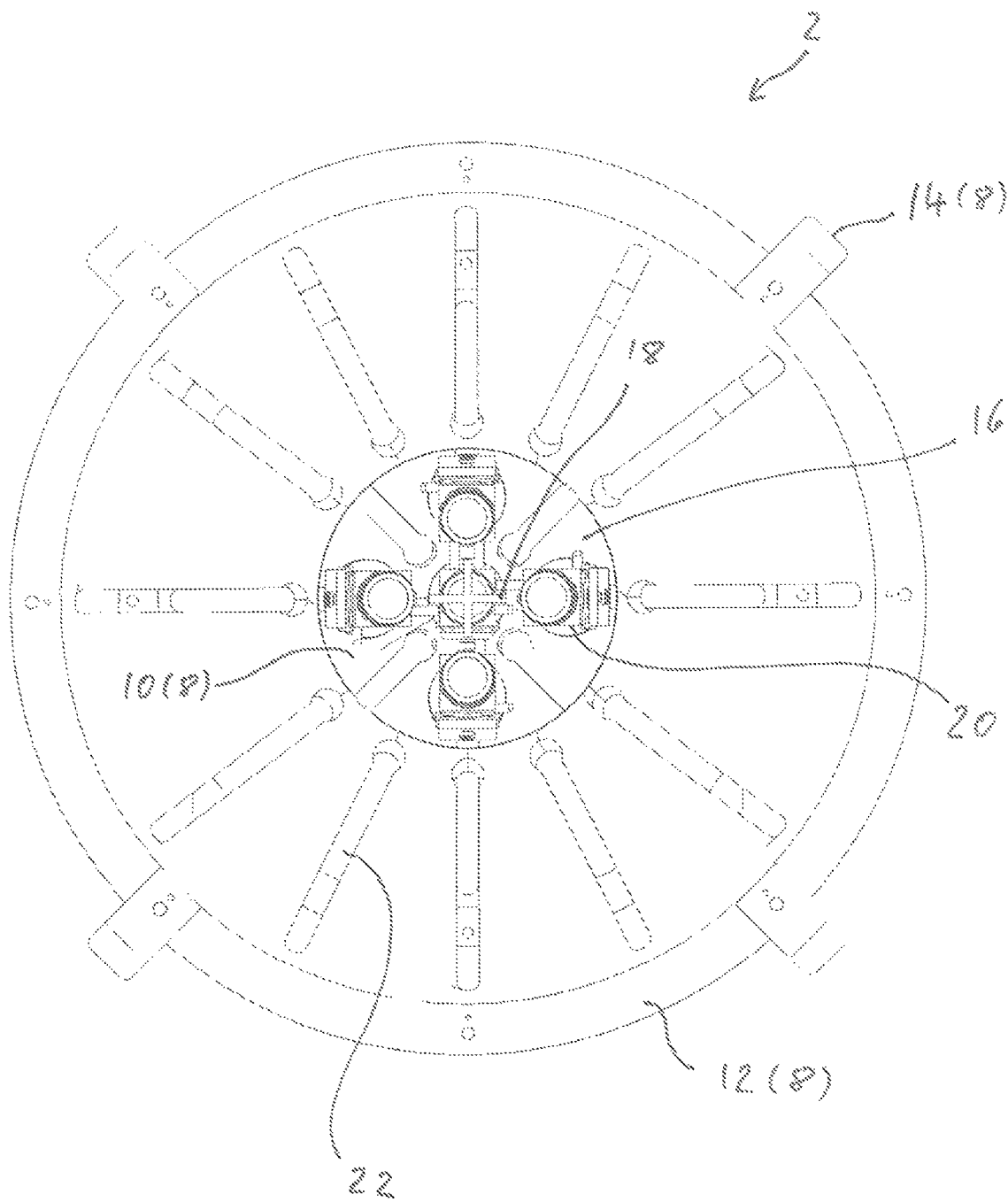
FIG. 3 illustrates a view of said device from below.

FIG. 3 is a view of the device 2 viewed from its underside. The MTF measuring devices 20 of the first group are visible, which look towards the sphere center 18. A central MTF measuring device 20 serves to carry out an on-axis measurement, the four MTF measuring devices 20 grouped therearound carry out off-axis MTF measuring devices. For reasons of clarity, the optical system 4 to be tested is not shown again.

Figure 4:
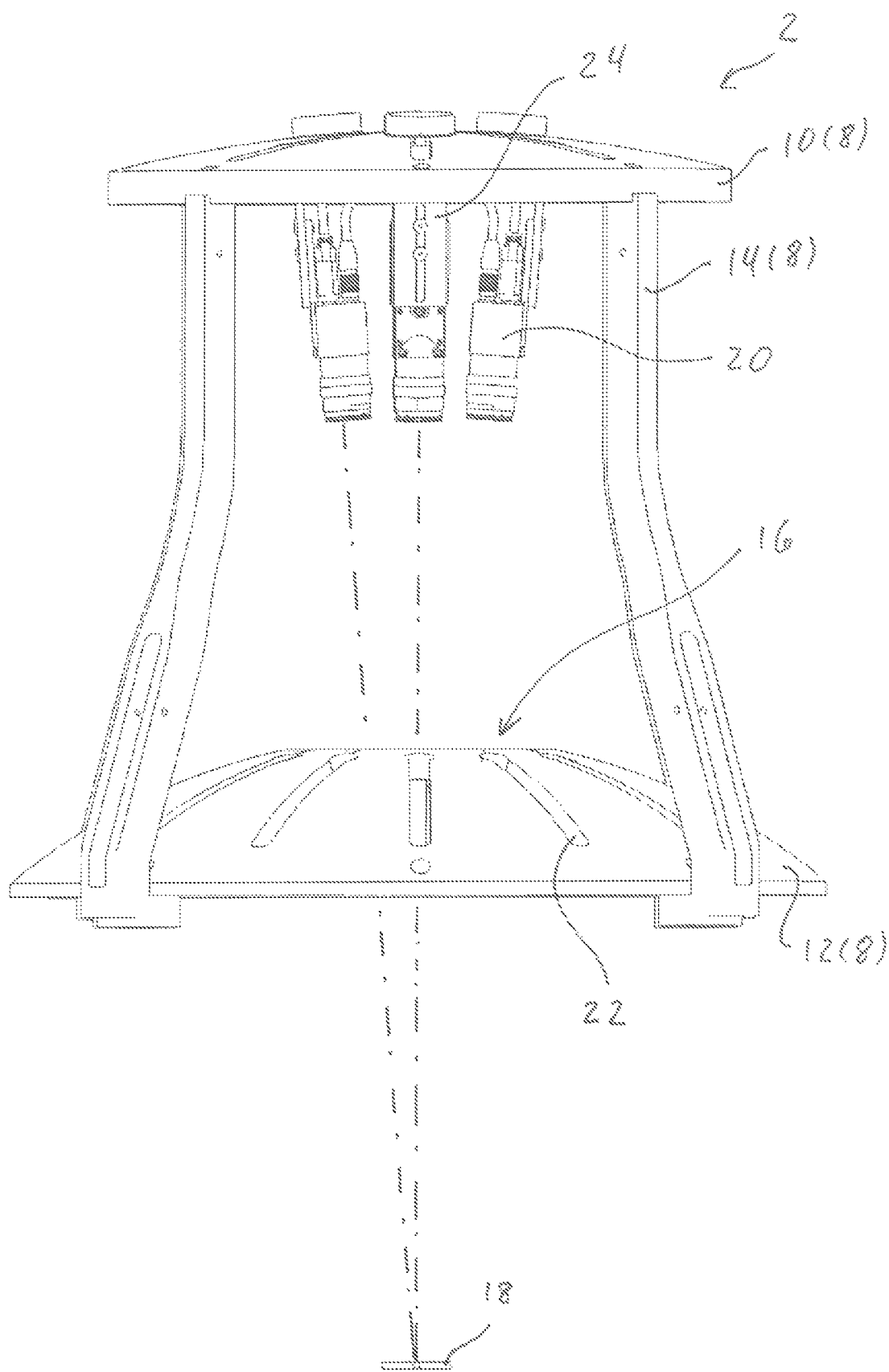
FIG. 4 illustrates a side view of said device.

FIG. 4 is a schematic and simplified side view of the device 2. In this figure, the optical system 4 is not shown, for reasons of clarity. The optical axis of the central MTF measuring device 20 for carrying out the on-axis measurement is shown in a dot-dashed line, as is the optical axis of an MTF measuring device 20 for carrying out the off-axis measurement. The optical axis of the on-axis MTF measuring device 20 coincides with the optical axis of the optical system 4 to be tested (not shown).

It is clearly visible in the side view that the first radius of the first spherical shell, in which the MTF measuring devices 20 of the first group are arranged, is greater than the second radius, in which the MTF measuring devices 20 of the second group (not shown in FIG. 4) can be arranged. This follows directly from a comparison of the different radii of curvature of the first holder 10 and of the second holder 12.

Figure 5:
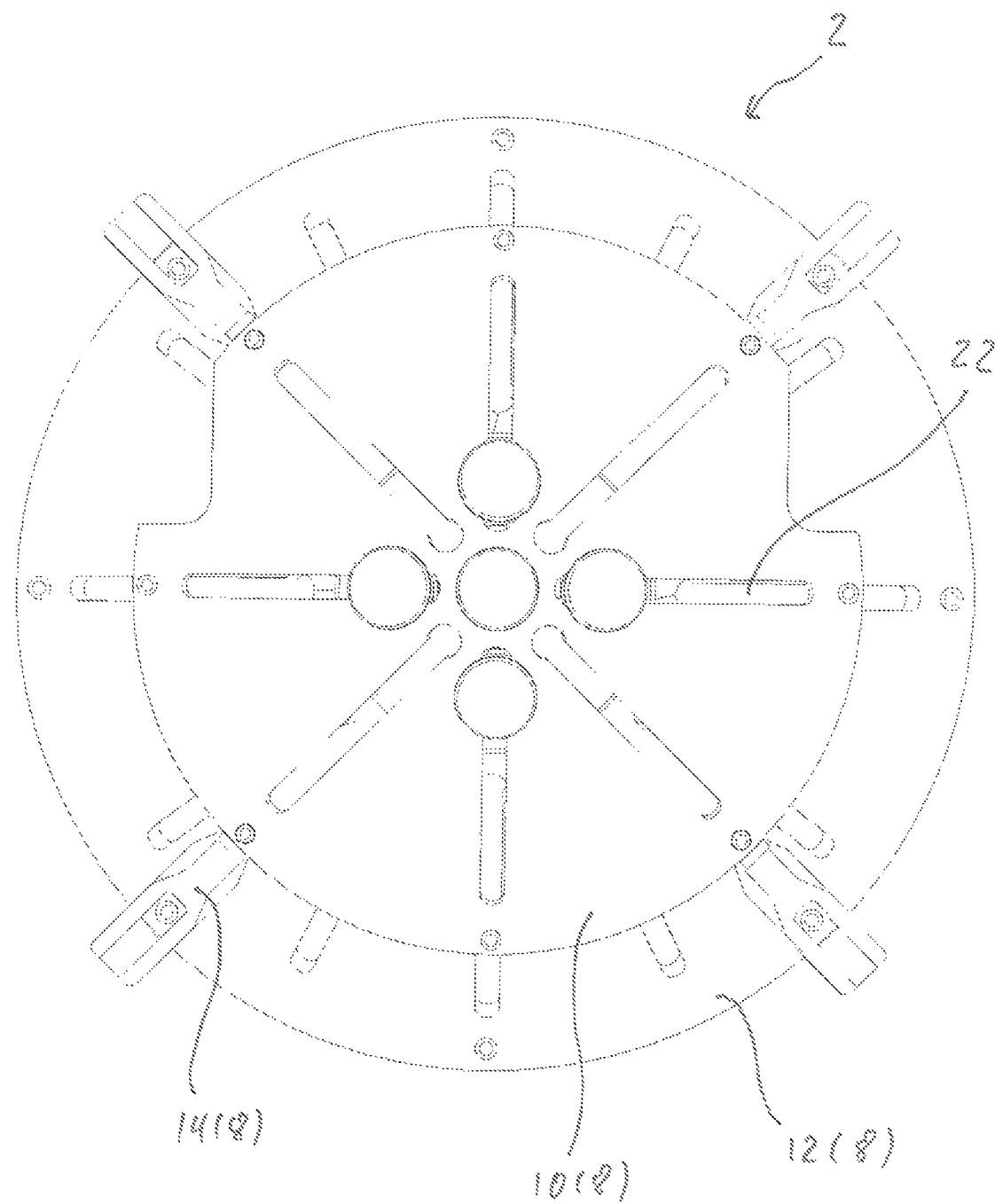
FIG. 5 illustrates a plan view of said device, FIGS. 6 and 7 each illustrate schematic and simplified perspective views of a device for measuring imaging properties of an optical system, according to a second embodiment.

FIG. 5 is a schematically simplified plan view of the device 2. In the plan view shown, the compact dimensions of the measuring device 2 in the lateral direction are evident. The first holder 10 and the second holder 12 have only slightly different diameters (cf. also FIG. 4), wherein the maximum dimensions are determined by the holding device 8.

It is furthermore visible in FIG. 5 that slots 22 of the first holder 10 and of the second holder 12, which are oriented along the main axes, are flush with one another. These are the horizontally or vertically extending slots 22 in FIG. 5. In order to increase the measuring point density, the slots 22, which are not used in the embodiment shown and which extend along the 45° divide between the horizontal and the vertical, could be occupied with additional MTF measuring devices 20. In this respect, the device 2 is flexible and can be adjusted to the measuring task desired in each case.

Figure 6:
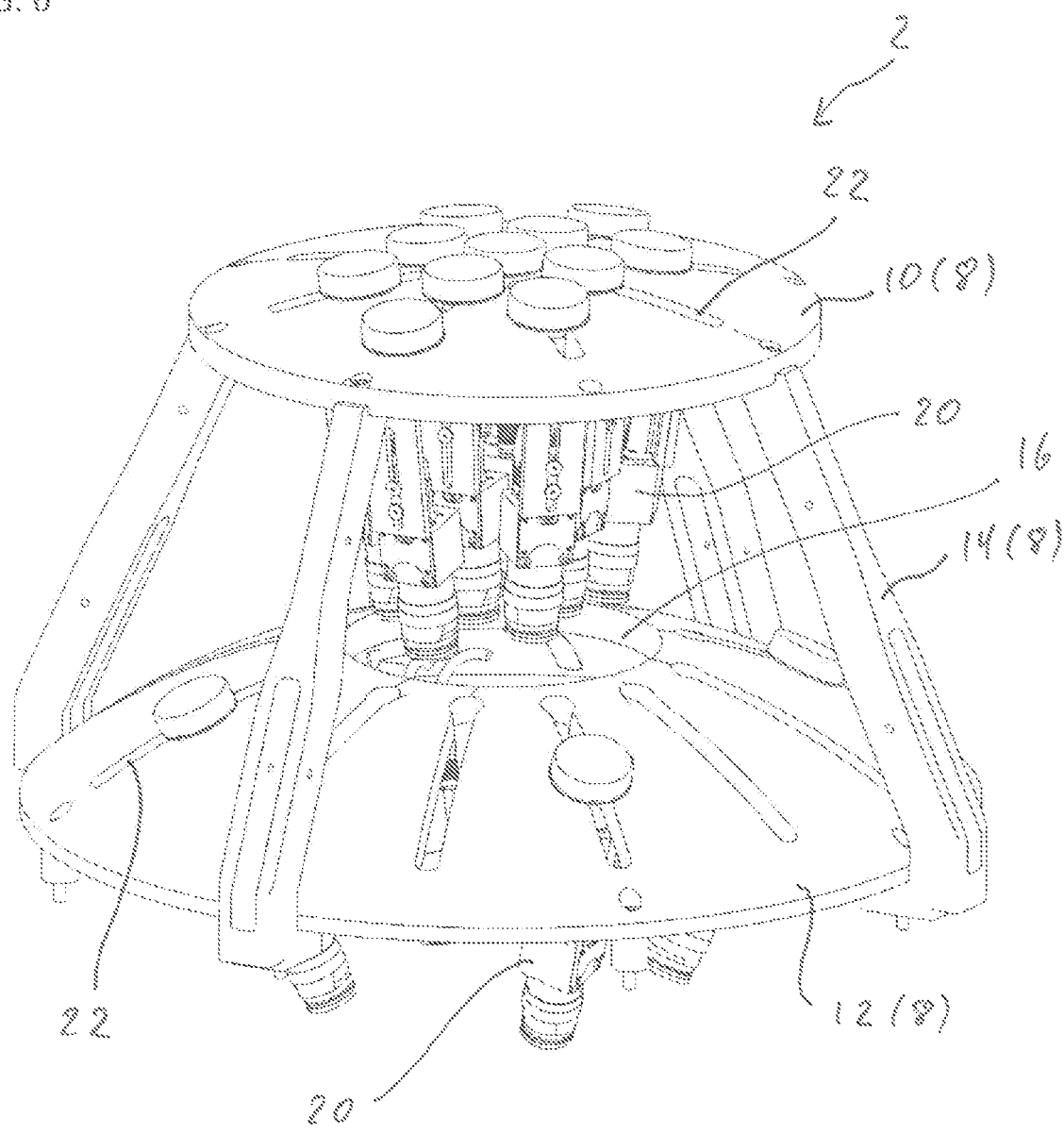
Figure 6:
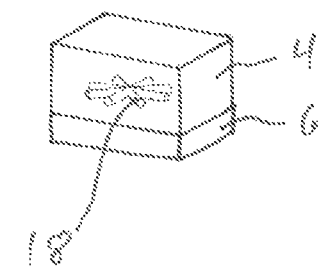

FIG. 6 is a schematic and simplified perspective view of a device 2 for measuring imaging properties of a refractive optical system 4, according to a further embodiment. The optical system 4 is again shown highly schematically. It is arranged on a test-object holder 6, by which the optical system 4 is positioned at a predefined testing position. The sphere center 18, which can lie in a plane of the aperture of the optical system 4 to be tested, is also shown in FIG. 6.

The device 2 shown again comprises a spherical cap-shaped or dome-shaped first holder 10, which, together with an annular but otherwise also spherical cap-shaped or dome-shaped second holder 12 and the struts 14 connecting these, forms a holding device 8 for the MTF measuring devices 20 of said device 2. The second holder 12 again comprises a central opening 16, through which the MTF measuring devices 20 of the first group look. In the embodiment shown, MTF measuring devices 20 of the second group are also shown, which measuring devices are received on the second holder 12.

Figure 7:
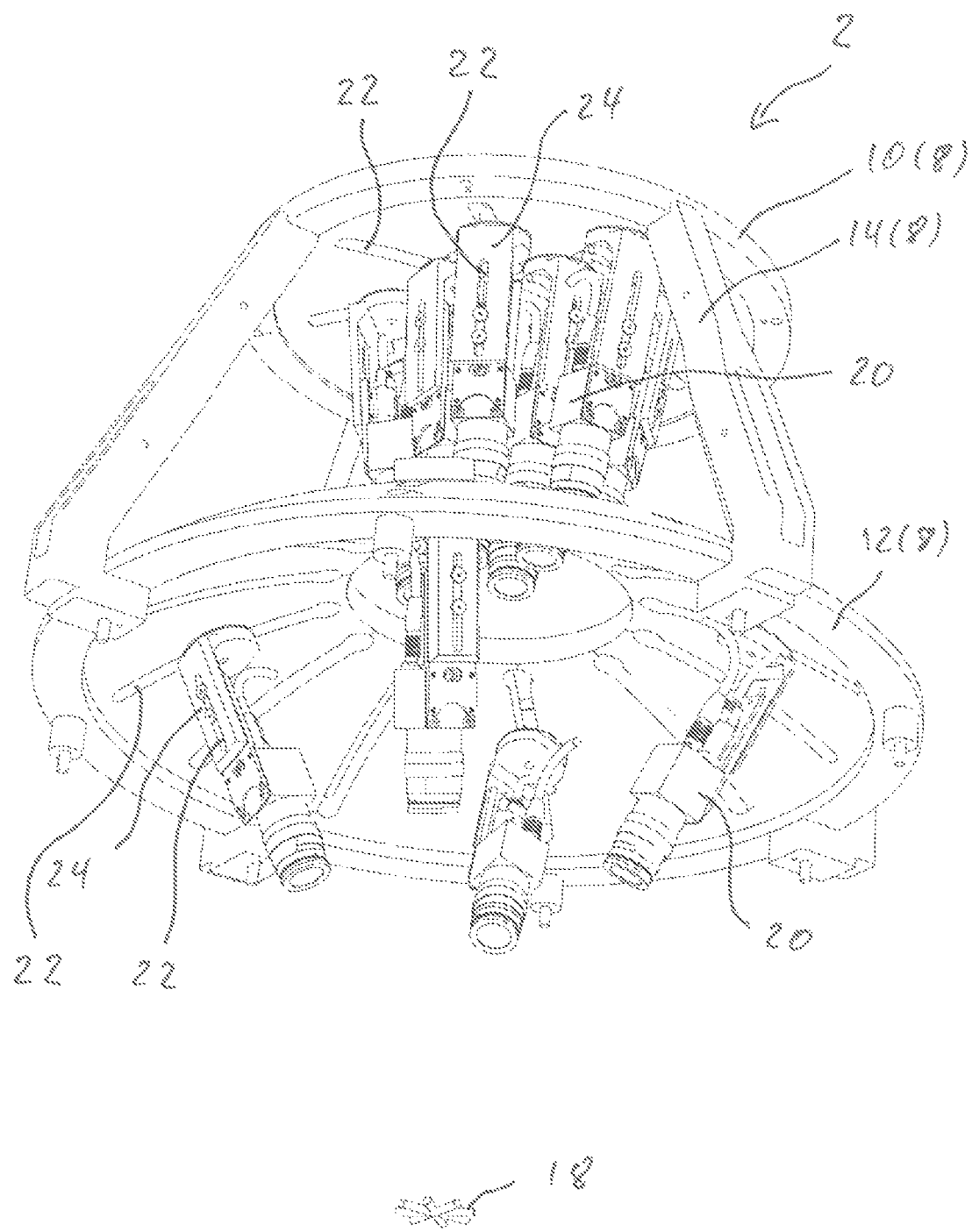

FIG. 7 is a further perspective view of the device 2 known from FIG. 6, in this case more from below. The MTF measuring devices 20 of the second group, the optical axes of which, just like the optical axes of the MTF measuring devices 20 of the first group, intersect in the sphere center 18, are clearly visible. The MTF measuring devices 20 of the second group make it possible to carry out MTF measurements on the optical system 4 to be tested over a large field angle. The high measuring point density in a central image region of the optical system 4, which is provided by the large number of the MTF measuring devices of the first group, is also clearly visible. The receiving of the MTF measuring devices 20 of both the first and second group, by corresponding camera holders 24, is also clearly visible in FIG. 7. As already mentioned above, these shift the MTF measuring devices 20 radially inwards, such that the MTF measuring devices 20 of the first group are arranged on the first spherical shell, and the MTF measuring devices 20 of the second group are arranged on a second spherical shell having a second radius. The first radius is clearly larger than the second radius of the second spherical shell.

The MTF measuring devices 20 are attached to the holding device 8 at firmly predefinable positions. For the purpose of adjustment, however, these can be displaced along the slots 22. In a similar manner, the radial spacings of the MTF measuring devices 20 along the camera holder 24 can also be changed. For this purpose, these also comprise slots 22.

Figure 8:
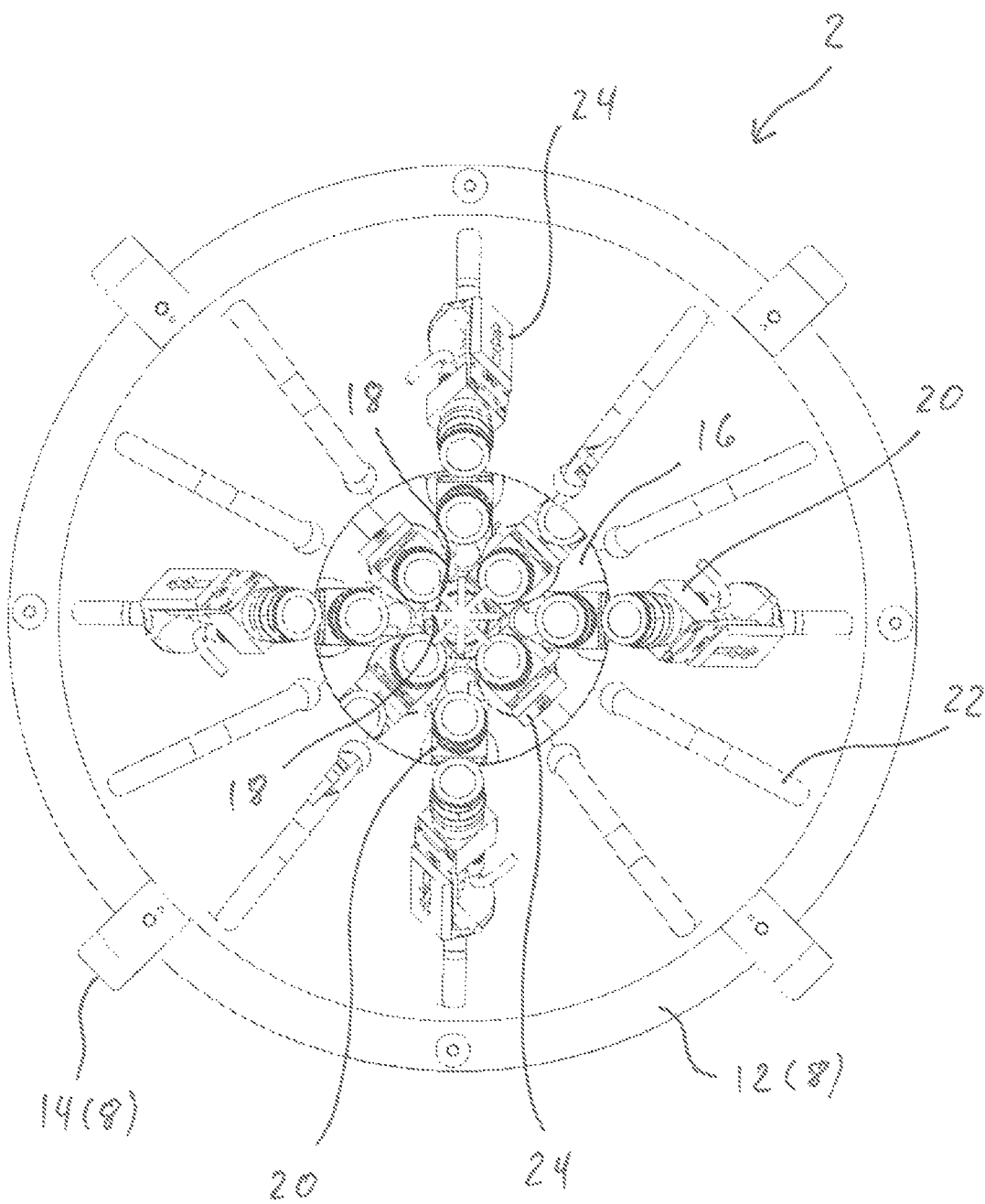
FIG. 8 illustrates a view of said device from below.

FIG. 8 is a view from below of the device 2 known from FIGS. 6 and 7. For reasons of clarity, the optical system 4 to be tested is again not shown; only the sphere center 18 is shown. The MTF measuring devices 20 of the first group look through the opening 16 of the second holder 12. Their visibly denser arrangement ensures the high measuring point density in the central image region of the optical system 4 to be tested.

Figure 9:
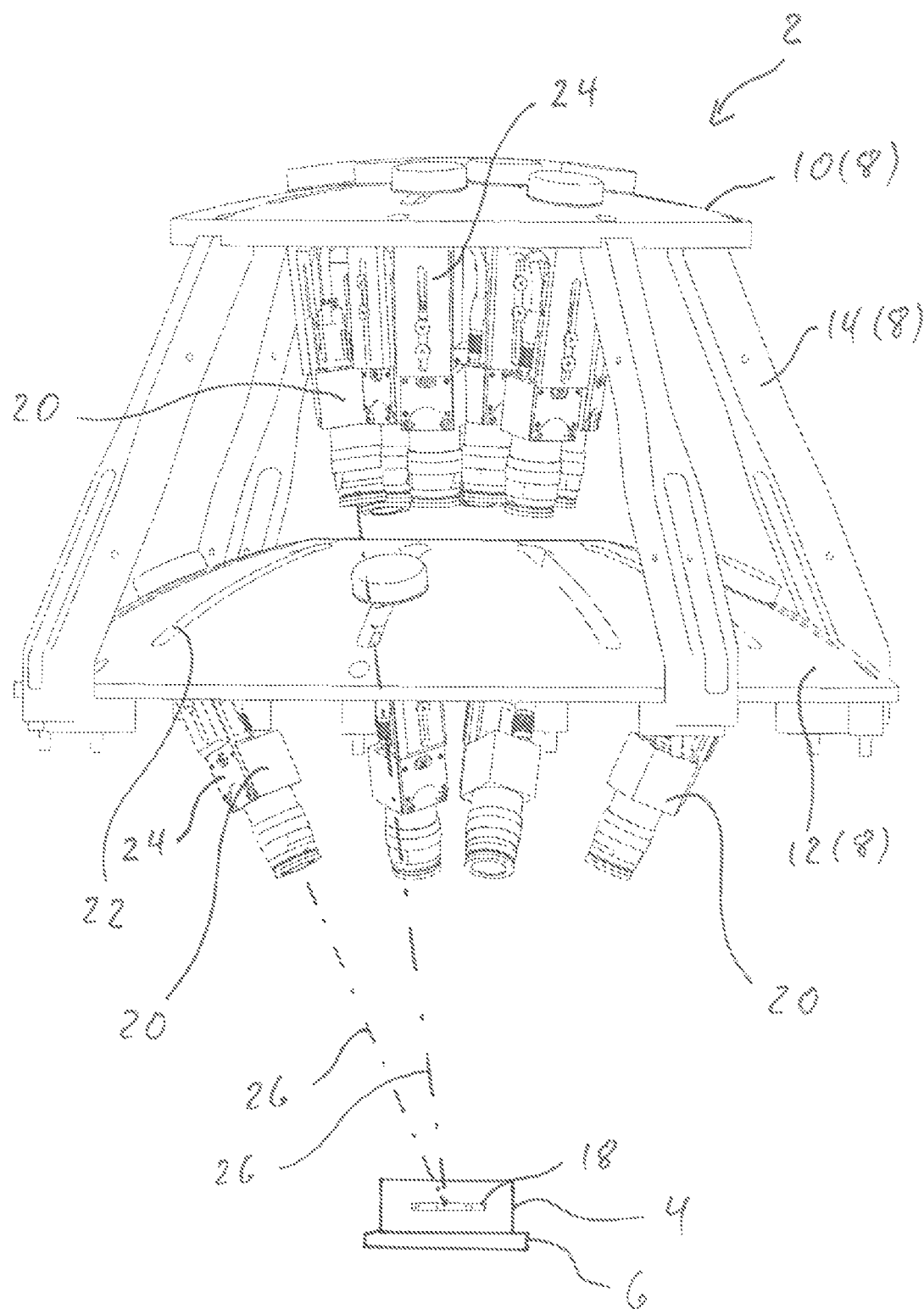
FIG. 9 illustrates a first side view of said device.

FIG. 9 is a schematically simplified side view of the device 2 according to the second embodiment. It is clearly visible that the MTF measuring devices 20 of the first group are arranged on a first spherical shell having a larger radius than the MTF measuring devices 20 of the second group (held by the second holder 12), which are arranged on a second spherical shell having a smaller radius. By way of example, for an MTF measuring device 20 of the first group, the optical axis 26 thereof is shown by a dot-dashed line. For an MTF measuring device 20 of the second group, too, an optical axis 26 is indicated in a dot-dashed line by way of example. The optical axes 26 of all the MTF measuring devices coincide in the sphere center 18, which, by way of example, is located in the aperture of the optical system 4 to be tested.

Figure 10:
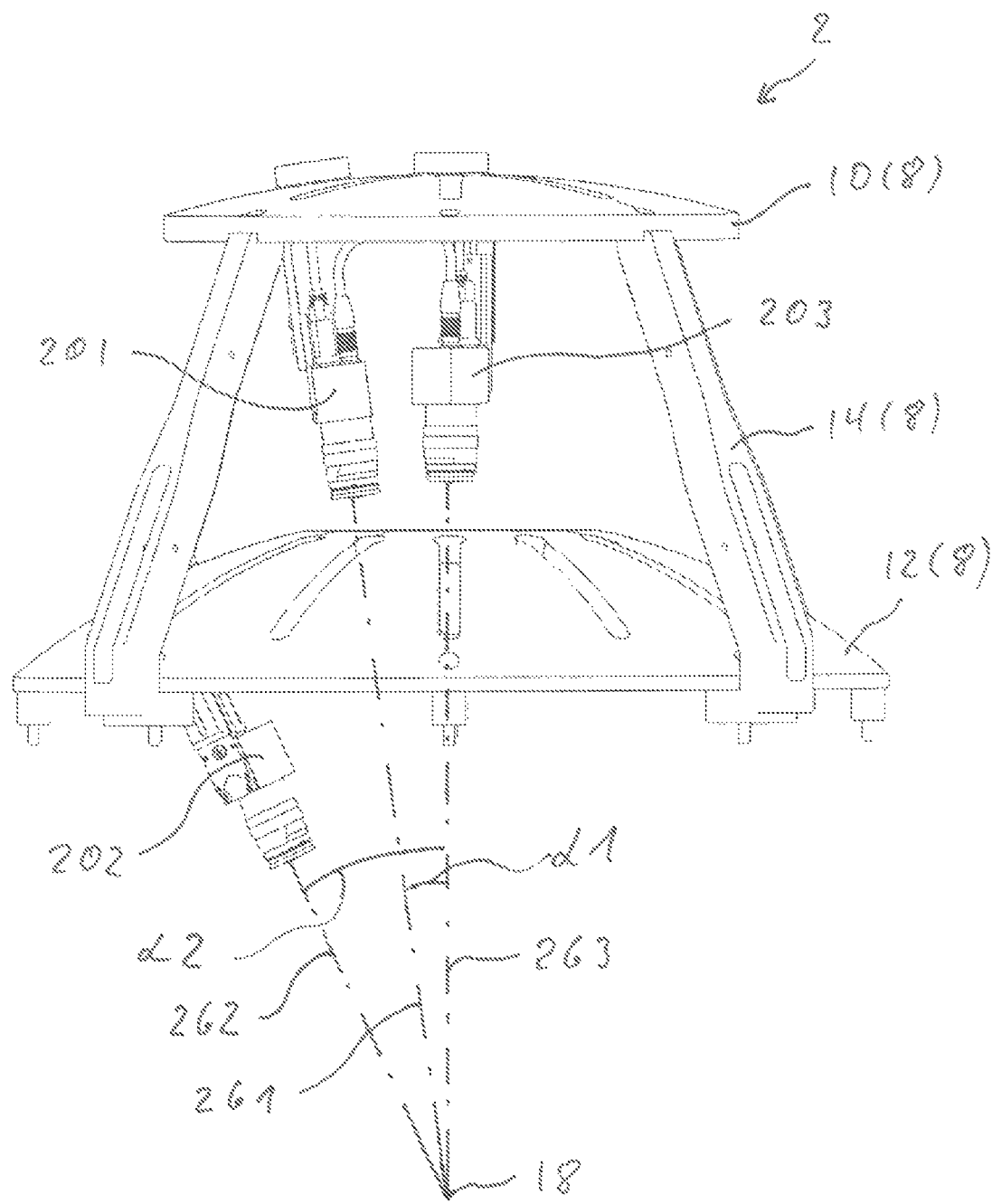
FIG. 10 illustrates a further side view of said device, wherein only some of the MTF measuring devices are shown.

FIG. 10 is a schematically simplified side view of the device 2 according to the second embodiment, wherein only an on-axis MTF measuring device 203, one of the MTF measuring devices 201 of the first group, and an MTF measuring device 202 of the second group are shown. The respective optical axes 263, 261 and 262 coincide in the sphere center 18. The optical axis 263 of the on-axis MTF measuring device 203 corresponds to an optical axis of the optical system 4 to be tested (not shown).

A first lateral angle α1 between the optical axis 263 of the optical system 4 to be tested and the optical axis 261 of the MTF measuring device 201 of the first group is smaller than a second lateral angle α2 measured between the optical axis 263 of the optical system 4 to be tested and the optical axis 262 of the MTF measuring device 202 of the second group. This applies for all the MTF measuring devices 201 of the first group, which in each case enclose a smaller lateral angle, together with the optical axis 263 of the optical system 4 to be tested, than any MTF measuring device 202 of the second group. This means, in other words, that the MTF measuring devices 201 of the first group are configured to acquire measured values in a central imaging region of the optical system 4 to be tested.

It is moreover the case that a further lateral angle between two adjacently arranged MTF measuring devices 201 of the first group is always smaller than a lateral angle between two adjacently arranged MTF measuring devices 202 of the second group. This means, in other words, that the MTF measuring devices of the first group are arranged closer together than those of the second group.

Figure 11:
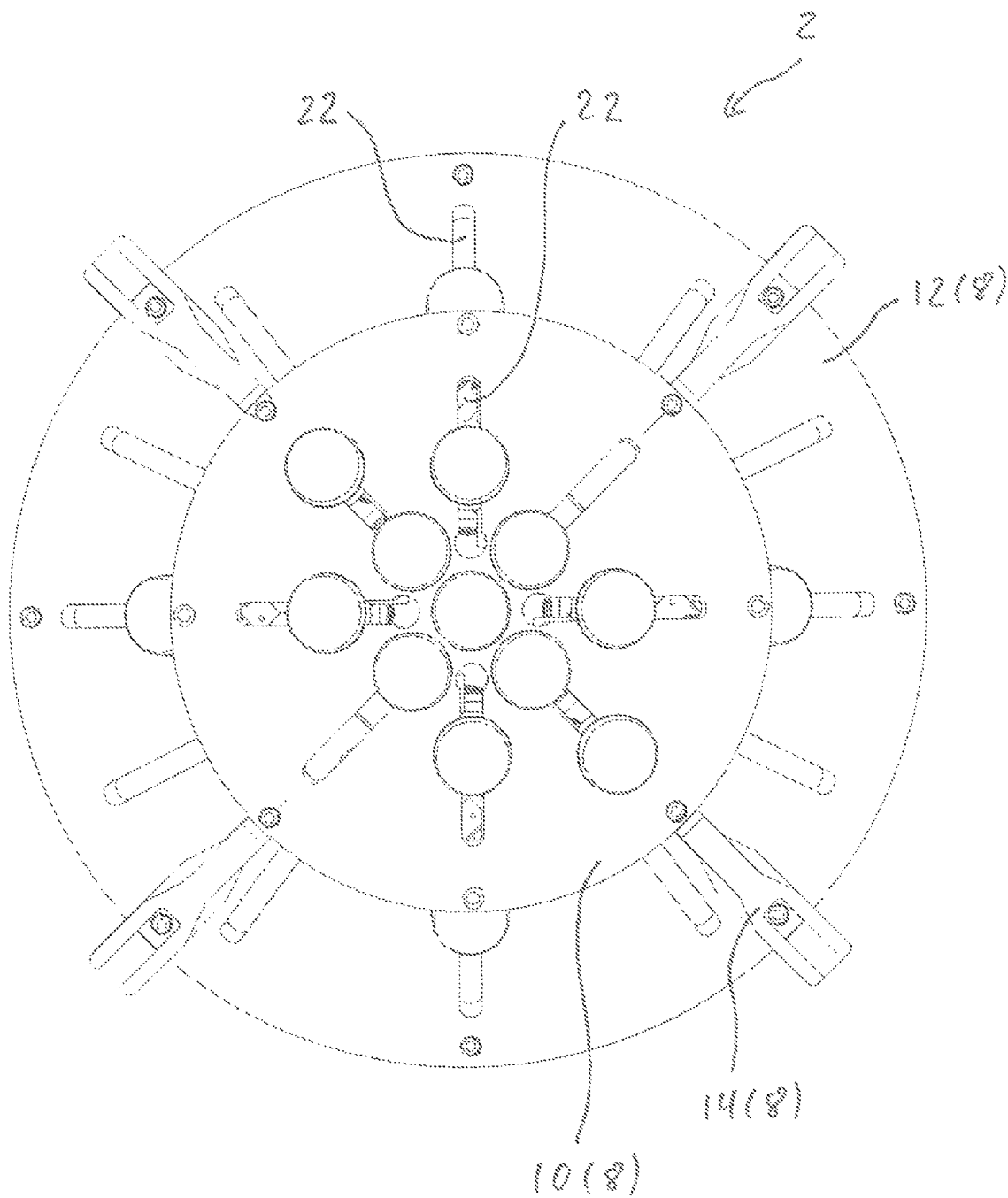
FIG. 11 illustrates a plan view of the device according to the second embodiment, FIGS. 12 and 13 each illustrates schematic and simplified perspective views of a device for measuring imaging properties of an optical system, according to a third embodiment.

FIG. 11 is a schematically simplified plan view of the device 2 according to the second embodiment. In this view, too, the higher density of the MTF measuring devices 20 of the first group, visible from the fastening elements thereof present on the rear face, which elements are for example knurled screws and which are in each case present on the upper side of the first or second holder 10, 12, is visible. The arrangement of the MTF measuring devices 20 is merely by way of example; the density thereof can be increased or decreased by adding and/or removing corresponding MTF measuring devices 20 on the first and/or second holder 10, 12 in the first or second group. Such an adjustment of the device 2 can take place in a flexible manner depending on the measuring task, wherein the MTF measuring devices 20 again remain at firmly predefined positions for the measuring task in question. For flexible mounting of the MTF measuring devices 20, slots 22 are provided in the first and second holder 10, 12. The slots 22 of the first and of the second holder 10, 12 can again be arranged flush with one another, along the directions that extend horizontally and vertically in FIG. 10.

Figure 12:
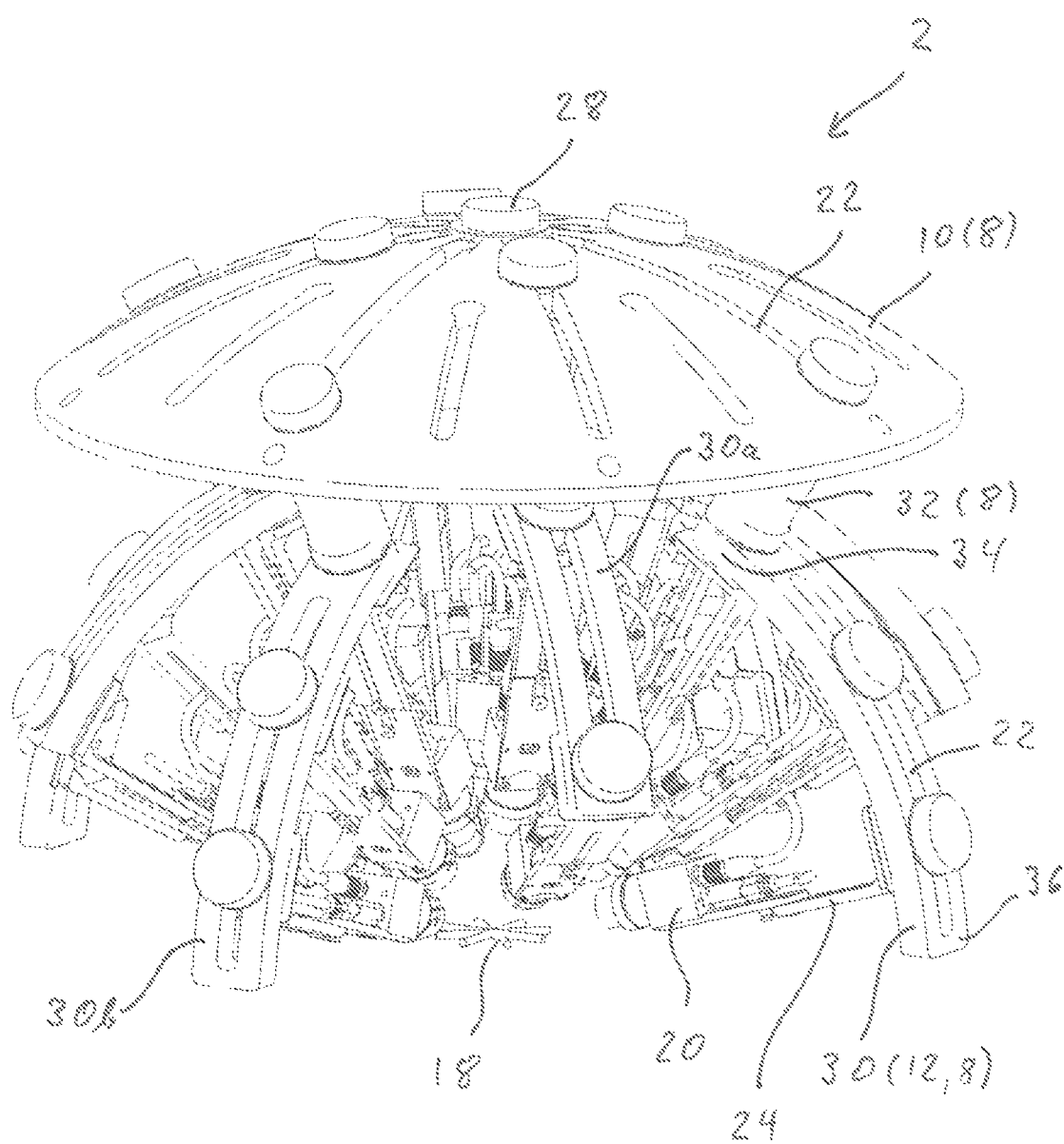

FIG. 12 is a schematic and simplified perspective view of a device 2 for measuring imaging properties of a refractive optical system 4 according to a third embodiment. The device 2 comprises a first holder 10 which is configured as a spherical cap. Just one single MTF measuring device 20 is directly fastened centrally to said dome-shaped first holder 10, which measuring device carries out an on-axis measurement. The associated knurled screw 28, by which said MTF measuring device 20 is fastened to the dome-shaped first holder 10, is visible centrally on the first holder 10 in FIG. 12. The remaining MTF measuring devices 20 are fastened to the second holder 12, which is configured in the form of a plurality of brackets 30. Said brackets, referred to generally by reference number 30, are fastened to the dome-shaped first holder 10 by cylindrical connecting pieces 32.

The brackets 30, from which the second holder 12 is constructed, extend along great circles of the second spherical shell, proceeding from a first end 34 towards a distal free end 36. The brackets 30 are in each case fastened at their first ends 34 to the first holder 10 by the connecting pieces 32. The second holder 12, constructed from brackets 30, is flexible as far as the connection with the first holder 10 can be changed along a great circle, along the slots 22 provided in the first holder 10. It is thus possible, for example, for the bracket 30a to be fastened closer to the center of the first holder 10, and a further bracket 30b can be fastened further towards the edge of the first holder 10. The MTF measuring devices 20 are also adjustably fastened to the brackets 30. For this purpose, the brackets 30 are also provided with slots 22, which extend in the direction of a longitudinal extension direction of the bracket 30 in question.

Figure 13:
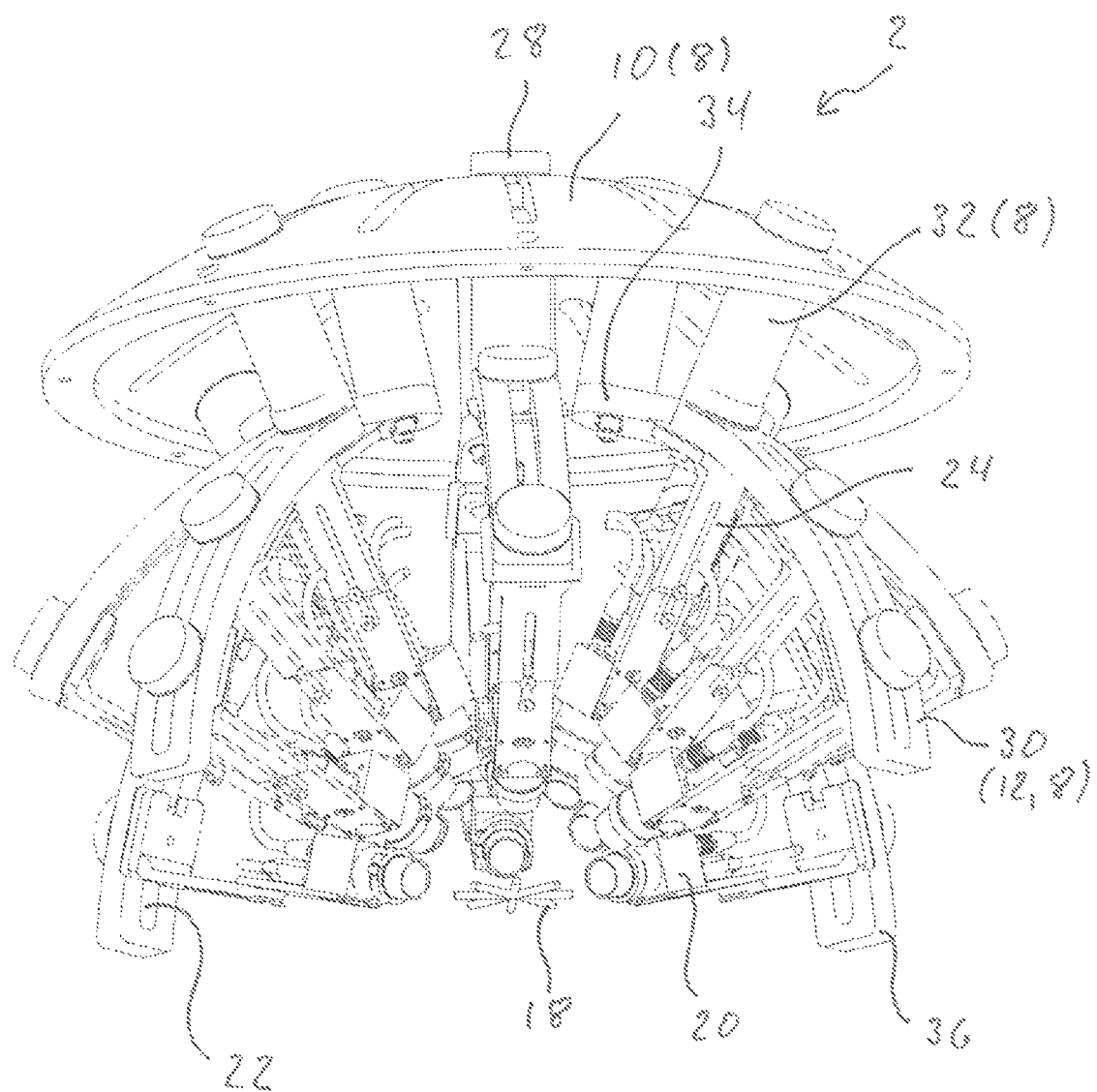

FIG. 13 is a further schematic and simplified perspective view of the device 2 according to the third embodiment, more from below. The MTF measuring devices 20 are all configured in such a way that their optical axes intersect in the sphere center 18, which can in turn be located in an opening aperture of an optical system 4 to be tested. The optical system 4 is not shown, for reasons of clarity. The embodiment shown can be suitable for testing optical systems 4 having extremely large image angles. MTF measurements can be recorded over a very large image angular range.

Figure 14:
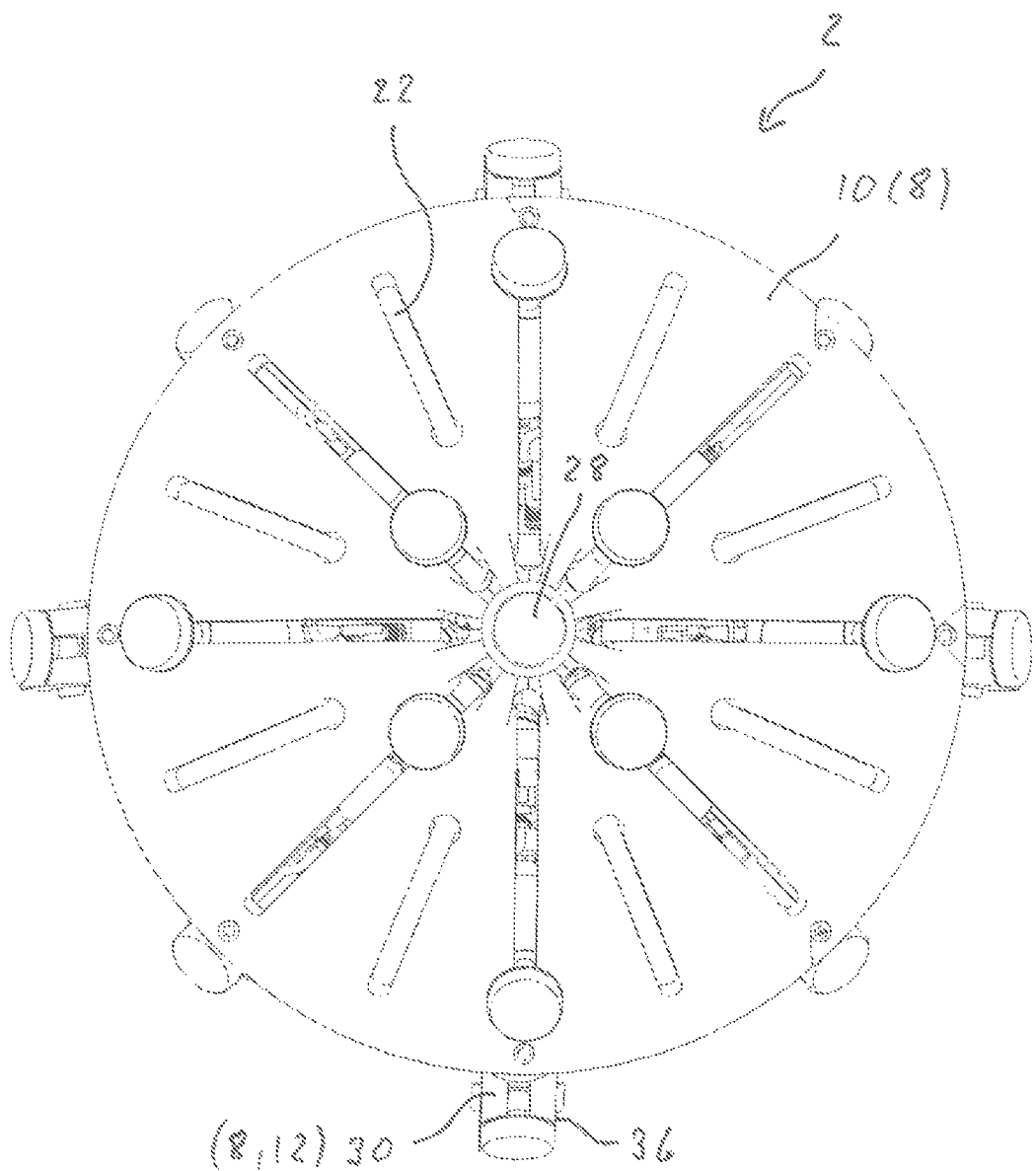
FIG. 14 illustrates a plan view of said device.

FIG. 14 is a plan view of the upper side of said device 2. The compact dimensions of the measuring device 2 are visible. The second holder 12, constructed from the brackets 30, protrudes only slightly beyond the outer edge of the first holder 10, and merely the free ends 36 of the brackets 30 are visible. The slots 22 present in the first holder 10 are clearly visible, which slots extend in a star-shaped manner from the center of the holder 10 in the direction of the edge thereof, and along which the brackets 30 of the second holder 12 are displaceable.

Figure 15:
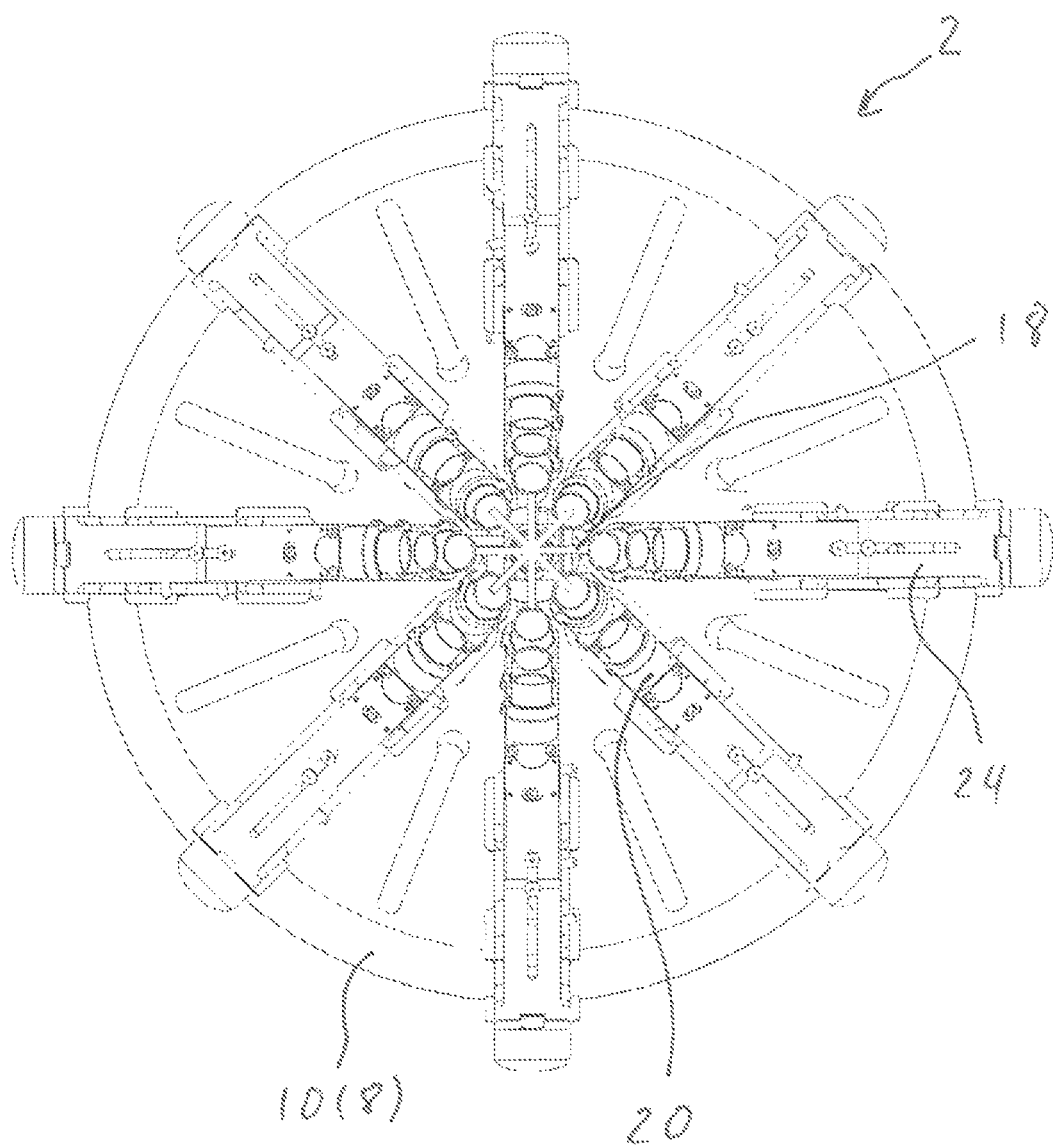
FIG. 15 illustrates a view of said system from below.

FIG. 15 shows the device 2 from below. In each case thee or two MTF measuring devices 20 are arranged, alternately, on the brackets 30 of the second holder 12. All the MTF measuring devices 20 are directed towards the sphere center 18. The MTF measuring device 20 for carrying out the on-axis measurement is located centrally.

Figure 16:
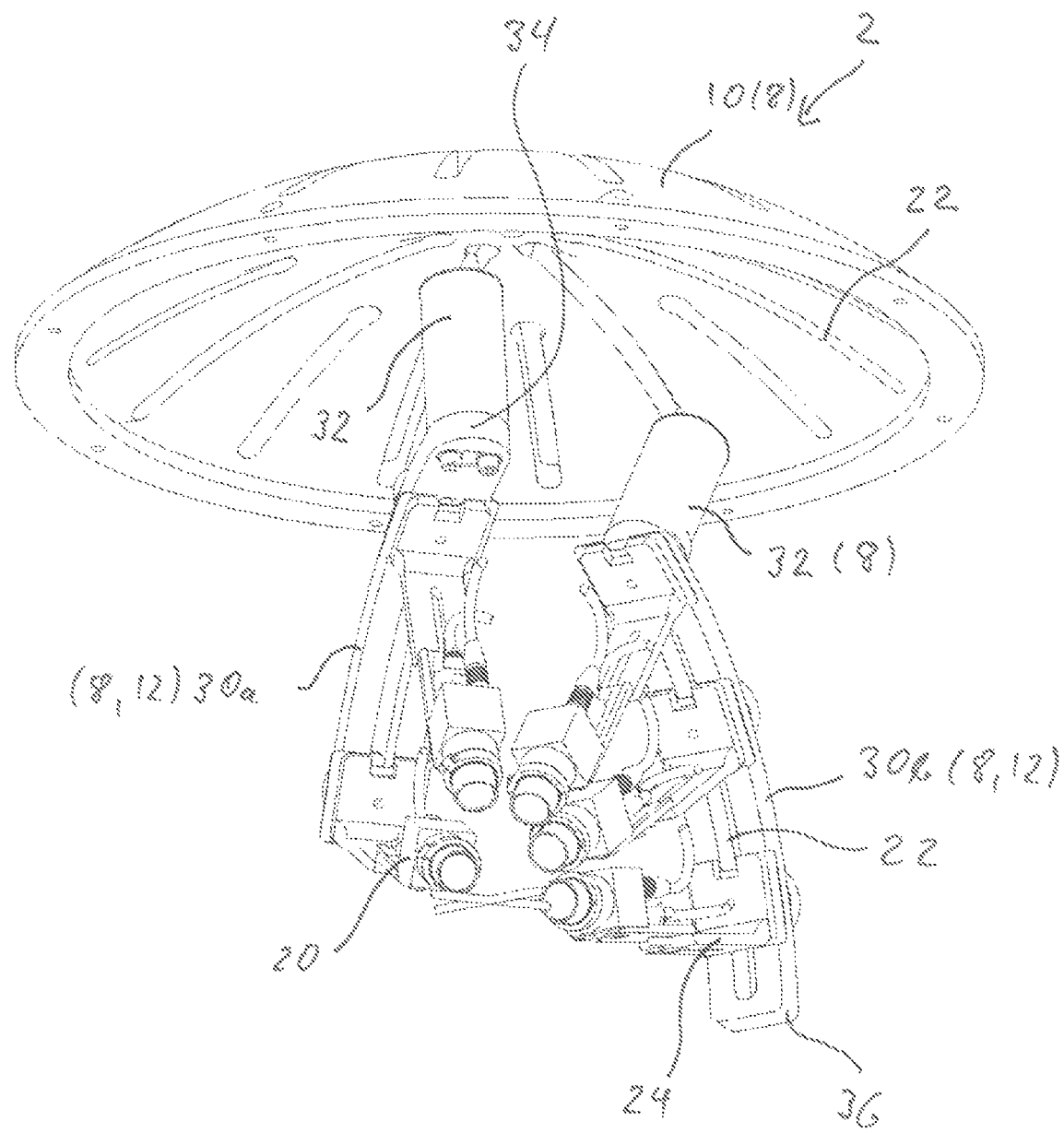
FIG. 16 illustrates a schematic and simplified perspective detailed view of said system, wherein only some of the MTF measuring devices are shown.

FIG. 16 is a schematically simplified perspective view of the device 2 according to the third embodiment, wherein just two brackets 30 of the second holder 12 are shown. A first bracket 30a, which is received relatively centrally on the first holder 10, by the connecting piece 32, receives, by way of example, two MTF measuring devices 20. The second bracket 30b, which is received relatively far to the outside on the first holder 10, by its connecting piece 32, receives, by way of example, three MTF measuring devices 20. As already described in the context of the rest of the embodiments, the MTF measuring devices 20 are fastened to the second holder 12, formed by the brackets 30 and the connecting pieces 32, by corresponding camera holders 24.

Figure 17:
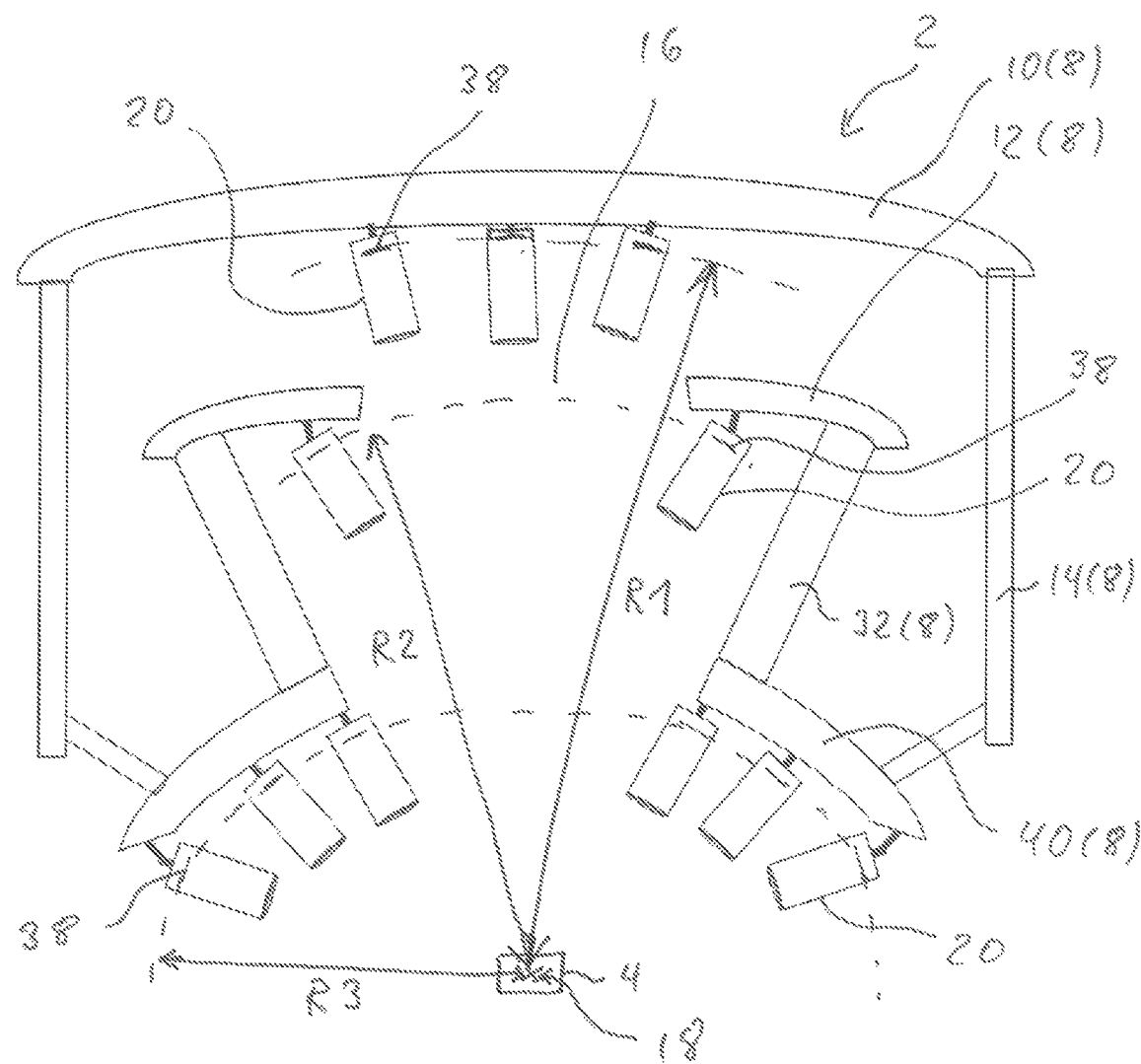
FIG. 17 illustrates a schematic and simplified sectional view of a device for measuring imaging properties of an optical system, according to a fourth embodiment.

FIG. 17 is a highly schematic and simplified sectional view of a further device 2 for measuring imaging properties of a refractive optical system 4 according to a fourth embodiment. This device 2 comprises a first holder 10 which is again configured as a spherical cap. This is configured to fasten the MTF measuring devices 20 of a first group on a spherical shell having a first radius R1. The image sensors 38 of the camera used as the MTF measuring device 20 can be arranged on said first spherical shell. The device 2 further comprises a second holder 12, which is configured in an annular manner and comprises an opening 16 in the center. This is configured to hold the MTF measuring devices 20 of a second group on a spherical shell having a second radius R2. Again, the image sensors 38 of said MTF measuring devices 20 are arranged on said second spherical shell. The device 2 further comprises a third holder 40, which holds MTF measuring devices 20 of a third group arranged in such a way that the image sensors 38 thereof are located on a third spherical shell having a third radius R3. The following applies: $R3 \leq R2 \leq R1$.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE CHARACTERS 2 device
4 optical system
6 test-object holder
8 holding device
10 first holder
12 second holder
14 struts
16 opening
18 sphere center
20 MTF measuring device
201 MTF measuring device of the first group
202 MTF measuring device of the second group
203 on-axis MTF measuring device
22 slot
24 camera holder
26 optical axis
261 first optical axis
262 second optical axis
263 optical axis of the optical system
28 knurled screw
30 bracket
30b bracket
32 connecting piece
34 first end
36 free end
38 image sensors
40 third holder
$\alpha 1$ first angle
$\alpha 2$ second angle
R1 first radius
R2 second radius
R3 third radius

What is claimed is:

1. A device for measuring imaging properties of an optical system, the device comprising:
a rigid holding device; and
a plurality of MTF measuring devices arranged at predefined positions of the holding device such that, by each of the plurality of MTF measuring devices, a modulation transfer function can be measured at respective different, predefinable, angular positions in the image field of the optical system,
wherein the holding device comprises at least a first holder and a second holder,
wherein the plurality of MTF measuring devices comprises a first group and a second group of MTF measuring devices,
wherein the first holder is configured to hold the plurality of MTF measuring devices of the first group at first positions so that the plurality of MTF measuring devices of the first group are arranged on the first holder on a first spherical shell,
wherein the second holder is configured to hold the plurality of MTF measuring devices of the second group at second positions so that the plurality of MTF measuring devices of the second group are arranged on the second holder on a second spherical shell, and
wherein the first spherical shell and the second spherical shell have different radii and are arranged so as to be mutually concentric.

2. The device according to claim 1, wherein the plurality of MTF measuring devices are arranged on the holding device such that the optical axes of the plurality of MTF measuring devices intersect in a plane of an aperture of the optical system to be tested.

3. The device according to claim 1, wherein the holding device comprises a third holder and the plurality of MTF measuring devices further comprises a third group of MTF measuring devices, wherein the third holder is configured to hold the plurality of MTF measuring devices of the third group at third positions so that the plurality of MTF measuring devices of the third group are arranged on the third holder on a third spherical shell, wherein the third spherical shell has a third radius different from the first radius and second radius and is arranged so as to be concentric to the first spherical shell and the second spherical shell.

4. The device according to claim 1, wherein the first radius of the first spherical shell is greater than the second radius of the second spherical shell, such that the plurality of MTF measuring devices of the first group each have a greater distance from the optical system to be tested than the plurality of MTF measuring devices of the second group.

5. The device according to claim 3, wherein a second radius of the second spherical shell is greater than the third radius of the third spherical shell, and
wherein the plurality of MTF measuring devices of the second group each have a greater distance from the optical system to be tested than the plurality of MTF measuring devices of the third group.

6. The device according to claim 1, wherein, for each of the plurality of MTF measuring devices of the first group, a first lateral angle between an optical axis of the optical system to be tested and a first optical axis of each of the plurality of MTF measuring devices in the first group is smaller than a second lateral angle between the optical axis of the optical system to be tested and a second optical axis of each of the plurality of MTF measuring devices of the second group.

7. The device according to claim 3, wherein, for each of the MTF measuring devices of the second group a second lateral angle between an optical axis of the optical system to be tested and a first optical axis of each of the plurality of MTF measuring devices of the second group is smaller than a lateral angle between the optical axis of the optical system to be tested and a second optical axis of each of the plurality of MTF measuring devices of the third group.

8. The device according to claim 1, wherein a lateral angle between two adjacently arranged MTF measuring devices of the plurality of MTF measuring devices of the first group is smaller than a lateral angle between two adjacently arranged MTF measuring devices of the plurality of MTF measuring devices of the second group.

9. The device according to claim 3, wherein a lateral angle between two adjacently arranged MTF measuring devices of the plurality of MTF measuring devices of the second group is smaller than a lateral angle between two adjacently arranged MTF measuring devices of the plurality of MTF measuring devices of the third group.

10. The device according to claim 1, wherein the at least first holder and the second holder of the holding device extend, at least in portions, along the corresponding spherical shell.

11. The device according to claim 1, wherein the first holder is configured as a first spherical cap, and the second is configured as a second spherical cap having a central opening.

12. The device according to claim 11, wherein the second holder is annular, and the second holder is configured in the form of a spherical zone.

13. The device according to claim 3, wherein the third holder is configured as a spherical cap.

14. The device according to claim 3, wherein the third holder is annular, and the third holder is configured in the form of a spherical zone.

15. The device according to claim 1, wherein the first holder is configured as a spherical cap and the second holder is configured as at least one bracket, wherein the at least one bracket is fastened to the first holder to extend along great circles of the first or second spherical shell in the direction of a distal free end, wherein the great circles extend within planes that intersect along an optical axis of the optical system to be tested.

16. The device according to claim 3, wherein the first holder is configured as a spherical cap and the third holder is configured as at least one bracket, wherein the at least one bracket is fastened to one of the first holder or the second holder to extend along great circles of the first or second spherical shell in the direction of a distal free end, wherein the great circles extend within planes that intersect along an optical axis of the optical system to be tested.

17. The device according to claim 1, wherein one or more of the at least first holder and the second holder of the holding device are configured such that a displacement of the corresponding first group or second group of the plurality of MTF measuring devices is variable on the corresponding first or second spherical shell.

18. The device according to claim 17, wherein one or more of the at least first holder and the second holder of the holding device comprises a radially extending slot to vary the displacement of the corresponding first group or second group of the plurality of MTF measuring devices on the corresponding first or second spherical shell.

19. A method for measuring imaging properties of an optical system comprising:
arranging the optical system to be tested in a test-object holder; and
simultaneously carrying out MTF measurements using a plurality of MTF measuring devices separated into at least a first group and a second group, the first group and the second group being adjustably fixed at predefined positions on respective first and second holders, the first holder holding the first group of the plurality of MTF measuring devices on a first spherical shell and the second group of the plurality of MTF measuring devices on a second spherical shell, the first spherical shell and the second spherical shell have different radii and are arranged so as to be mutually concentric.

20. A holder for measuring imaging properties of an optical system, the holder comprising:
at least a first holder and a second holder for holding a first group and a second group of MTF measuring devices at predefined positions,
wherein the first holder is configured to hold the plurality of MTF measuring devices of the first group at first positions so that the plurality of MTF measuring devices of the first group are arranged on the first holder on a first spherical shell,
wherein the second holder is configured to hold the plurality of MTF measuring devices of the second group at second positions so that the plurality of MTF measuring devices of the second group are arranged on the second holder on a second spherical shell, and
wherein the first spherical shell and the second spherical shell have different radii and are arranged so as to be mutually concentric.

* * * * *